United States Patent
Avala et al.

(10) Patent No.: US 11,526,825 B2
(45) Date of Patent: Dec. 13, 2022

(54) CLOUD-BASED MULTI-TENANCY COMPUTING SYSTEMS AND METHODS FOR PROVIDING RESPONSE CONTROL AND ANALYTICS

(71) Applicant: Cygnvs Inc., Los Altos, CA (US)

(72) Inventors: Sai Avala, San Ramon, CA (US); Darragh Buffini, Dublin (IE); Kevin Gaffney, Dublin (IE); Arvind Parthasarathi, Los Altos, CA (US)

(73) Assignee: Cygnvs Inc., Los Altos, CA (US)

( * ) Notice: Subject to any disclaimer, the term of this patent is extended or adjusted under 35 U.S.C. 154(b) by 233 days.

(21) Appl. No.: 16/940,272

(22) Filed: Jul. 27, 2020

(65) Prior Publication Data
US 2022/0027828 A1 Jan. 27, 2022

(51) Int. Cl.
*G06F 3/048* (2013.01)
*G06Q 10/06* (2012.01)
*G06F 3/0482* (2013.01)
*G06F 3/0483* (2013.01)

(52) U.S. Cl.
CPC ..... *G06Q 10/06393* (2013.01); *G06F 3/0482* (2013.01); *G06F 3/0483* (2013.01)

(58) Field of Classification Search
CPC .. G06Q 10/06393; G06Q 10/06; G06Q 10/10; G06Q 10/0633; G06F 3/0482; G06F 3/0483; G06F 3/04847; G06F 9/451
See application file for complete search history.

(56) References Cited

U.S. PATENT DOCUMENTS

| | | | | |
|---|---|---|---|---|
| 6,188,407 | B1 * | 2/2001 | Smith | G16H 40/67 345/902 |
| 8,151,323 | B2 | 4/2012 | Harris | |
| 8,832,268 | B1 * | 9/2014 | Chheda | H04L 67/1004 709/224 |
| 8,874,741 | B2 * | 10/2014 | Hassan | H04L 63/20 709/225 |
| 9,240,996 | B1 | 1/2016 | Sinnema | |

(Continued)

OTHER PUBLICATIONS

M. Sun, G. Convertino and M. Detweiler, "Designing a Unified Cloud Log Analytics Platform," 2016 International Conference on Collaboration Technologies and Systems (CTS), Orlando, FL, 2016, pp. 257-266, doi: 10.1109/CTS.2016.0057. (Year: 2016).*

(Continued)

*Primary Examiner* — Steven B Theriault
(74) *Attorney, Agent, or Firm* — Carr & Ferrell LLP

(57) ABSTRACT

Cloud-based multi-tenancy computing systems and methods for providing response control and analytics are disclosed. An exemplary method includes capturing a first set of data based on activities that occur in the activated response center related to the client's actions taken in response to the event; generating a first set of analytics based on the captured first set of data; capturing a second set of data based on activities that occur in a plurality of response centers of client tenants related to the clients' actions taken in response to the events that occurred to them;
generating a second set of analytics based on the captured second set of data; and based on the first and second set of analytics produced by the response system, generating and transmitting an updated menu of suggested actions for responding to a future event, to one or more of the clients.

20 Claims, 48 Drawing Sheets

(56) References Cited

U.S. PATENT DOCUMENTS

| | | | |
|---|---|---|---|
| 9,858,559 B2* | 1/2018 | Raleigh | G06Q 40/12 |
| 9,953,007 B2 | 4/2018 | Oyarzabal et al. | |
| 9,990,134 B2 | 6/2018 | Keeler | |
| 10,182,045 B2* | 1/2019 | Banga | H04W 4/70 |
| 10,234,853 B2* | 3/2019 | Mukkamala | G06F 3/04845 |
| 10,467,029 B1* | 11/2019 | Lin | G06F 9/451 |
| 10,483,003 B1* | 11/2019 | McNair | G16H 10/60 |
| 10,698,926 B2* | 6/2020 | Zhou | G06F 11/0778 |
| 10,708,135 B1* | 7/2020 | Elliott, IV | H04L 41/0893 |
| 10,797,964 B2* | 10/2020 | Chheda | G06F 11/0793 |
| 10,810,361 B1* | 10/2020 | Venkatraman | G06F 40/166 |
| 10,990,488 B1* | 4/2021 | Brown | G06F 11/2038 |
| 11,188,857 B1* | 11/2021 | Hill | G06F 3/167 |
| 11,354,430 B1 | 6/2022 | Tharakan et al. | |
| 2008/0086363 A1* | 4/2008 | Kass | G06Q 10/04 703/2 |
| 2009/0307166 A1* | 12/2009 | Routray | G06N 5/04 706/46 |
| 2010/0088636 A1* | 4/2010 | Yerkes | G06F 16/275 715/764 |
| 2010/0169860 A1* | 7/2010 | Biazetti | H04L 41/0806 717/107 |
| 2011/0010349 A1* | 1/2011 | Ellingson | G06Q 10/00 707/695 |
| 2011/0173679 A1 | 7/2011 | Perumal | |
| 2012/0158821 A1* | 6/2012 | Barros | G06F 16/254 709/203 |
| 2013/0191531 A1* | 7/2013 | Kruglick | H04L 41/5038 709/224 |
| 2014/0089039 A1* | 3/2014 | McClellan | G06Q 10/0635 705/7.28 |
| 2014/0278755 A1* | 9/2014 | Eberl | G06F 16/244 705/7.29 |
| 2015/0112700 A1* | 4/2015 | Sublett | G06Q 30/0201 705/2 |
| 2015/0120359 A1* | 4/2015 | Dongieux | G06F 16/285 705/7.15 |
| 2015/0134733 A1* | 5/2015 | Maturana | H04L 67/1097 709/203 |
| 2015/0154643 A1* | 6/2015 | Artman | G06Q 30/0269 705/14.66 |
| 2015/0163206 A1* | 6/2015 | McCarthy | G06F 21/10 713/171 |
| 2015/0172321 A1* | 6/2015 | Kirti | H04L 63/1416 726/1 |
| 2015/0281453 A1* | 10/2015 | Maturana | G05B 23/0213 379/265.12 |
| 2015/0310188 A1 | 10/2015 | Ford et al. | |
| 2015/0324400 A1* | 11/2015 | Sheck | H04W 4/80 707/795 |
| 2016/0294854 A1* | 10/2016 | Parthasarathi | H04L 63/20 |
| 2016/0335260 A1* | 11/2016 | Convertino | G06F 16/2358 |
| 2016/0378450 A1* | 12/2016 | Fu | G06F 8/60 717/177 |
| 2016/0378728 A1* | 12/2016 | Pryhuber | G06F 3/0482 715/732 |
| 2017/0006135 A1* | 1/2017 | Siebel | G06F 16/283 |
| 2017/0041296 A1 | 2/2017 | Ford et al. | |
| 2017/0099181 A1* | 4/2017 | Hawking | G06F 3/04842 |
| 2017/0124502 A1* | 5/2017 | Brew | H04L 67/42 |
| 2017/0132721 A1* | 5/2017 | Riley | G09C 1/00 |
| 2017/0149630 A1* | 5/2017 | Feller | H04L 41/0893 |
| 2017/0169699 A1* | 6/2017 | Will | G08B 25/016 |
| 2017/0195265 A1* | 7/2017 | Billi | G06Q 10/0631 |
| 2017/0255455 A1* | 9/2017 | Collier | G06F 11/3438 |
| 2017/0262142 A1* | 9/2017 | Riley | G06F 3/04847 |
| 2017/0282014 A1* | 10/2017 | Quinn | G16H 20/40 |
| 2018/0027006 A1* | 1/2018 | Zimmermann | G06F 9/46 726/11 |
| 2018/0144314 A1* | 5/2018 | Miller | G06Q 20/14 |
| 2018/0152358 A1* | 5/2018 | Chheda | G06F 11/079 |
| 2018/0165386 A1* | 6/2018 | Soundiramourthy | H04L 67/125 |
| 2018/0181716 A1* | 6/2018 | Mander | G06Q 10/0633 |
| 2018/0321820 A1* | 11/2018 | Burman | G06F 16/2282 |
| 2018/0365278 A1* | 12/2018 | Klöhn | G06N 3/08 |
| 2019/0034047 A1 | 1/2019 | Kwiecien et al. | |
| 2019/0065177 A1* | 2/2019 | Khoongumjorn | G06F 9/4488 |
| 2019/0095241 A1* | 3/2019 | Ago | G06F 16/2291 |
| 2019/0102440 A1* | 4/2019 | Tabak | G06F 16/951 |
| 2019/0163814 A1* | 5/2019 | Codella | G06F 40/186 |
| 2019/0325373 A1* | 10/2019 | Dillon | G06F 3/0482 |
| 2019/0339821 A1* | 11/2019 | Vajjala | G06F 11/3664 |
| 2020/0034764 A1* | 1/2020 | Panuganty | G06F 40/284 |
| 2020/0067789 A1* | 2/2020 | Khuti | G06F 16/88 |
| 2020/0097920 A1* | 3/2020 | Doctor | G06Q 10/063114 |
| 2020/0104401 A1* | 4/2020 | Burnett | G06F 16/2477 |
| 2020/0104402 A1* | 4/2020 | Burnett | G06F 16/243 |
| 2020/0151836 A1* | 5/2020 | Lingras | G06Q 10/06 |
| 2020/0160458 A1* | 5/2020 | Bodin | G06F 40/58 |
| 2020/0162917 A1* | 5/2020 | Anantha | H04L 63/0892 |
| 2020/0202271 A1* | 6/2020 | Brannon | G06F 21/577 |
| 2020/0210647 A1* | 7/2020 | Panuganty | G06F 16/254 |
| 2020/0218432 A1* | 7/2020 | Malhotra | G06F 3/0482 |
| 2020/0233685 A1* | 7/2020 | Petkov | G06F 21/6254 |
| 2020/0234218 A1* | 7/2020 | Salloum | G06N 20/00 |
| 2020/0342520 A1* | 10/2020 | Pandey | H04L 9/0637 |
| 2020/0344185 A1* | 10/2020 | Singaraju | G06F 16/9024 |
| 2020/0349173 A1* | 11/2020 | Chawla | G06F 16/254 |
| 2021/0120043 A1* | 4/2021 | Karpovsky | G06F 21/552 |
| 2021/0160018 A1* | 5/2021 | Han | G06Q 20/108 |
| 2021/0216381 A1* | 7/2021 | Huang | G06F 3/0482 |
| 2021/0275899 A1* | 9/2021 | Hyodo | A63F 13/79 |
| 2021/0409218 A1 | 12/2021 | Elmenshawy | |
| 2022/0027828 A1* | 1/2022 | Avala | G06F 3/0482 |

OTHER PUBLICATIONS

R. Kilgore, A. Godwin, A. Davis and C. Hogan, "A Precision Information Environment (PIE) for emergency responders: Providing collaborative manipulation, role-tailored visualization, and integrated access to heterogeneous data," 2013 IEEE International Conference on Technologies for Homeland Security (Year: 2013).*

W. D. Yu, A. Gottumukkala, D. A. Senthailselvi, P. Maniraj and T. Khonde, "Distributed Big Data Analytics in Service Computing," 2017 IEEE 13th International Symposium on Autonomous Decentralized System (ISADS), Bangkok, 2017, pp. 55-60, doi: 10.1109/ISADS.2017.17. (Year: 2017).*

Czajkowski et al., "ERMrest: An Entity-relationship Data Storage Service for Web-based, Data-oriented Collaboration," Oct. 19, 2016, 12 pages.

* cited by examiner

FIG. 25

| GROUPS | Location | Responsibilities |
|---|---|---|
| Breach Coach/Outside Counsel | External | Coordination of Incident Response |
| | | Legal Advice |
| Call Center | External | Supports Internal Legal Team |
| Credit Monitoring | External | Supports internal Call Center team for client Q&A hotline |
| | | Credit monitoring services for affected people |
| Crisis Communications/Outside Public Relations | | Crisis Messaging |
| eDiscovery | External | Supports Internal Public Relations Team |
| Finance | Internal | eDiscovery Services as part of a legal/regulatory investigation |
| | | Coordination with IT/Security to ensure assets safe |
| | | Evaluate financial impact and liability |
| Forensics/Security Consulting | External | Security expertise |
| | | Digital Forensics |
| | | Remediation |
| Human Resources | Internal | Supports internal IT/Security team |
| | | Manage internal communications |
| | | Support services for employees |
| Insurance Broker | External | Represents company in insurance purchasing/policies |
| Insurer | External | Expertise across clients in incident response |
| | | What is covered by insurance |
| | | Vendor panels |
| IT/Security | Internal | Contain incident |
| | | Work with forensics to determine cause |
| | | Restoration and remediation |
| Law Enforcement | External | Support with forensics, especially with nation state actors |
| | | Ensure compliance with all laws |
| | | Issue written stay of notice where necessary |
| Legal | Internal | Assemble Team |
| | | Legal fact finding |
| | | Notify governments, regulators, etc. |
| | | Notification determination |
| | | Contractual implications |
| Negotiation Services | External | Negotiation management |
| Print/Mailing/Notification | External | Print or online notification services |
| Project Management | Internal | Assemble Team |
| | | Coordination |
| | | Classification and Closeout |
| | | Project Management |
| | | Engage Vendors |
| Public Relations | Internal | Engaging with Senior Management |
| | | Manage external communications |
| | | Coordinate with outside PR or Crisis Communications |
| | | Manage information leaks |
| Risk Management | Internal | Insurance coverage |
| | | Coordinate containment process |
| Senior Management/Board | Internal | Overall Responsibility |
| | | Messaging to shareholders/customers |

FIG. 26A

| FACTS | Detail |
|---|---|
| Accessibility of Information Compromised | |
| Amount of Information Compromised | |
| Business Unit Affected | |
| Groups Aware of Incident | |
| Groups Impacted by Incident | |
| KRI Category | |
| Place of Incident | |
| Potential Privacy Breach | |
| Risk to Individuals | |
| Risk to Organization | |
| Threat Level | |
| Time of Incident | |
| Time/Date Incident Discovered | |
| Time/Date Incident Reported | |
| Type of Data Security Incident | |
| Type of Information Compromised | |

FIG. 26B

| ACTIONS | |
|---|---|
| Actions taken to resolve incident | Engage 3rd-party vendors to help with incident mailers and credit monitoring services and implement changes to affected systems |
| Assign a Threat Level | Determine the threat level of the incident |
| Classification | Determine the type of incident, type of information and type of risk caused by the incident for individuals and the organization. |
| Close out incident | Report conclusion of incident response to leadership, regulators and stakeholders and close out incident after all attributes are documented |
| Containment | Contain incident and determine what risk management measures should be put in place (e.g. call insurer) |
| Contractual coverage | Implement any necessary measures to ensure terms of contracts are followed during a breach |
| Determination if Incident Constitutes a Breach | Determine if incident meets internal threshold for a breach |
| Determine incident cause | Determine what caused the breach by bringing in forensic experts where required and assigning relevant circumstances |
| Documentation | Document and log all information relevant to the incident (automatically done once incident plan is completed) |
| Future remediation | Institute appropriate measures to make sure this does not happen again |
| Internal Reporting of Incident | Notify supervisory personnel and incident response team |
| Legal and Financial coverage | Implement any fact-finding process required or reporting to relieve the company of future liability where possible (e.g. determine if company has insurance), file necessary suits and determine the extent of financial damages if any |
| Notification to Affected Individuals and Public | Notify those potentially affected individuals while also appearing in the media as needed |
| Notification to employees | Provide internal messaging about the incident to employees and instruct them how to interact with the media or external stakeholders |
| Notification to Law Enforcement | Notify local and federal authorities depending on the scope of the incident and receive written stay of notice if necessary |
| Notification to leadership | Notify leadership after incident response team has assembled |
| Notification to Legal Counsel | Immediately notify legal counsel |
| Notification to Regulators | Notify regulators in the time period required by the regulatory body and provide appropriate supporting details |
| Notify relevant oversight agencies | In the case of a credit card breach, healthcare breach or other incident that is overseen by an industry association or agency, report incident in accordance with policy |
| Regulatory coverage | Implement necessary measures to ensure regulations are followed for incidents |

FIG. 26C

| GROUPS | Location (?N/A?) | Responsibilities |
|---|---|---|
| Lawyer | Internal | Determine liability and courses of action |
| | | Defend against and File lawsuits |
| | | Support negotiation |
| Family Office | Internal | Coordination and Management |
| | | Accounting, Administration |
| | | Coordination between family and vendors |
| | | Provides updates to HNWI |
| Private Investigator | Internal | Conducts forensic analysis and incident investigation |
| Insurer | External | Expertise across clients in incident response |
| IT Consultant | Internal | Contain incident and determine cause |
| | | Restoration and remediation |
| Law Enforcement | External | Support with forensics |
| | | Recover stolen items |
| Negotiation Services | Internal | Negotiation management |
| Family Members | Internal | Coordination and Management |
| | | Identifies incident |
| Appraiser | Internal | Assess value, costs, damage, taxes |
| Hospital/Medical Provider | External/Internal | Provides medical care |
| Marine Product/Boat Repairer | External | Fixes marine products or boats harmed in accident |
| Personal Article Repairer | External | Fixes or restores collectables damaged |
| Veterinarian | Internal/External | Provides medical services for animals |
| Home Contractor | External | Fixes issues with residence or vacation properties |
| Farm/Ranch Manager | Internal | Faciliates farm operations |
| | | Files for necessary subsidies |
| | | Manages personnel issues |
| Vehicle Mechanic | External | Repairs and restores automobiles |
| Airplane Mechanic | External | Repairs and restores airplane |

FIG. 28A

| FACTS | Detail |
|---|---|
| Item | |
| Make | |
| Model | |
| Original Cost | |
| Incident Type | |
| Assessed Value After Incident | |
| Fixable | |
| Interest in Fixing | |
| Replaceable | |
| Interest in Replacing | |
| Cost to Fix | |
| Cost to Replace | |
| Location of Incident | |
| Time of Incident | |
| Time/Date Incident Discovered | |
| Time/Date Incident Reported | |
| Liability | |

FIG. 28B

| ACTIONS | Detail * for each group engaged, all actions are performed per Group as per Group tab |
|---|---|
| Primary Home | HNWI identifies incident, Notifies family office, Family Office engages appraiser, law enforcement (where appropriate) and insurer, Family Office hires Home Contractor |
| Recreational Marine | HNWI or Family Office identifies incident, Notifies family office, Family Office engages appraiser, law enforcement (where appropriate) and insurer, Family Office hires Marine Product Repairer |
| Personal Articles | HNWI or Family Office identifies incident, Notifies family office, Family Office engages appraiser, lawyer, law enforcement (where appropriate) and insurer, Lawyer files suit with offending party, Family Office hires Personal Articles Repairer |
| Other Individuals | HNWI or Family Office identifies incident, Notifies family office, Family Office engages lawyer, private investigator, law enforcement (where appropriate) and insurer, Lawyer files suit against offending party or brokers a deal |
| Equine | HNWI or Family Office identifies incident, Notifies family office, Family Office engages Vet |
| Kidnapping or Ransom | HNWI or Family Office identifies incident, Notifies family office, Family Office engages lawyer, private investigator, negotiation services, law enforcement and insurer, Negotiation services broker a deal with legal support |
| Secondary Home | HNWI or Family Office identifies incident, Notifies family office, Family Office engages appraiser, law enforcement (where appropriate), lawyer to file suit (where appropriate) and insurer, Family Office hires Home Contractor |
| Condo Association | HNWI or Family Office identifies incident, Notifies family office, Family Office engages appraiser, law enforcement (where appropriate), lawyer to file suit (where appropriate) and insurer, Family Office hires Home Contractor |
| Vacant Dwelling | HNWI or Family Office identifies incident, Notifies family office, Family Office engages appraiser, law enforcement (where appropriate), lawyer to file suit (where appropriate) and insurer, Family Office hires Home Contractor |
| Farm or Ranch | Family Office identifies incident, Family Office engages lawyer and insurer, Family Office works with Farm/Ranch Manager |
| Data/IT Systems | Family Office identifies incident, Family Office engages lawyer, law enforcement and insurer, Family Office works with IT Consultant and Negotiation Services (where applicable) |
| Vehicles | HNWI or Family Office identifies incident, Notifies family office, Family Office engages lawyer, private investigator, law enforcement (where appropriate) and insurer, Lawyer files suit against offending party or brokers a deal, Family Office hires Vehicle Mechanic |
| Aircraft | HNWI or Family Office identifies incident, Notifies family office, Family Office engages lawyer, private investigator, law enforcement (where appropriate) and insurer, Lawyer files suit against offending party or brokers a deal, Family Office hires Aircraft Mechanic |
| Identity Theft | Family Office identifies incident, Family Office engages lawyer, law enforcement and insurer |
| Domestic Employees | HNWI or Family Office identifies incident, Notifies family office, Family Office engages lawyer, private investigator, law enforcement (where appropriate) and insurer, Lawyer files suit against offending party or brokers a deal |
| Organizations | HNWI identifies organization they are on the board for, Notifies family office, Family Office engages lawyer, and insurer |
| Health | HNWI identifies incident, Notifies Insurer and Hospital/Medical Provider |
| Life | Family Office notifies Hospital/Medical Provider, Notifies Lawyer and Notifies Insurer |
| ACTIONS | Detail * for each group engaged, all actions are performed per Group as per Group tab |

FIG. 28C

Fisher Family

[ MARK COMPLETE ]

POLICY    FEED    SETUP    FACTS    SCOPE    ACTIONS    EXECUTION    INVOICES

Insurer

Broker

Policy Details

Policy Documents

FIG. 29

| GROUPS | Location | Responsibilities |
|---|---|---|
| General Counsel | Internal | Reviews demands and determines liability and extent |
| | | Coordinates with external counsel |
| | | Work with 3rd party providers to coordainte activity |
| | | Provides updates to the Board |
| Insurance Broker | External | Package plaintiff demand letter for claim submission |
| Insurer | External | Assigns an adjuster to review details of the claim and policy |
| | | Works with insured to understand full story |
| | | Notifies insured of what allegations are covered and what are not and the % allocation |
| | | Evaluates settlement decisions if there is a Hammer Clause |
| Legal – Company | External | Reviews claims and reverts back to plaintiff |
| | | Hires forensic consultant |
| | | Reviews settlements that are proposed |
| Forensic Consultant | External | Conducts diligence on the case to support legal defense |
| Public Relations | Internal | Manage external communications |
| | | Coordinate with outside PR or Crisis Communications |
| | | Manage information leaks |
| Accounting | Internal | Financial and Audit analysis and validation |
| | | Work with external Auditing Firm |
| Human Resources | Internal | Employee and Personnel investigations |
| Directors and Officers | Internal | Responsibility, Coordination, Updates |
| Risk Management | Internal | Coordinate with Broker and Insurer |
| Legal – Individual D&O | External | Reviews claims and reverts back to plaintiff |
| | | Hires forensic consultant |
| Auditing Firm | External | Financial and Audit analysis and validation |
| | | Work with internal accounting firm |

FIG. 30A

| FACTS | Detail |
|---|---|
| Director(s) and/or Officer(s) being sued | |
| Type of suit | |
| Alleged person(s) wrongfully harmed | |
| Damages sought | |
| Date of suit | |
| Date of incident | |
| Location of incident | |
| Contracts involved | |
| Competitors involved | |
| Creditors involved | |
| Government agencies involved | |
| Plaintiff | |
| Plaintiff Counsel | |
| Class Action status | |

FIG. 30B

| SCOPE | Detail |
|---|---|
| E.E.O.C. | |
| O.S.H.A. | |
| Consumer Product Safety Act standards | |
| Securities and Exchange Act of 1934 | |
| Model Business Corporation Act | |
| Gramm Leach Bailey | |
| Sarbanes Oxley | |
| UK Financial Services and Markets Act | |
| EU Directive 2003/71/EC | |
| EU Markets in Financial Instruments Directive | |
| German Securities Prospectus Act | |
| German Stock Exchange Act | |

FIG. 30C

| ACTIONS | Detail |
|---|---|
| Determination if Suit is Company or D&O liability | Determine if incident meets internal guidelines for D&O or company liability |
| Determine incident cause | Determine what incident caused the suit |
| Documentation | Document and log all information relevant to the suit |
| Future remediation | Institute appropriate measures to make sure this does not happen again |
| Legal and Financial coverage | Implement any fact-finding process required or reporting to relieve the company of future liability where possible (e.g. determine if company has insurance), file necessary suits and determine the extent of financial damages if any |
| Notification to Affected Individuals and Public | Notify those potentially affected individuals while also appearing in the media as needed |
| Notification to employees | Provide internal messaging about the incident to employees and instruct them how to interact with the media or external stakeholders |
| Notification to leadership | Notify leadership after incident response team has assembled |
| Notification to Regulators | Notify regulators in the time period required by the regulatory body and provide appropriate supporting details |
| Notify relevant oversight agencies | Report incident in accordance with policy of any agencies overseeing company's industry |

FIG. 30D

| GROUPS | Location | Responsibilities |
|---|---|---|
| Finance | Internal | Coordination with IT/Security to ensure assets safe |
| | | Evaluate financial impact and liability |
| Human Resources | Internal | Manage internal communications |
| | | Support services for employees |
| IT/Security | Internal | Contain incident |
| | | Work with forensics to determine cause |
| | | Restoration and remediation |
| Legal | Internal | Legal fact finding |
| | | Notification determination, governments, regulators |
| | | Contractual implications |
| Project Management | Internal | Assemble Team |
| | | Coordination, Classification, Closeout |
| | | Engage Vendors/Management |
| Public Relations | Internal | Manage external communications |
| | | Coordinate with outside PR or Crisis Communications |
| | | Manage information leaks |
| Risk Management | Internal | Insurance coverage |
| | | Coordinate containment process |
| Senior Management/Board | Internal | Overall Responsibility |
| | | Messaging to shareholders/customers |
| Breach Coach/Outside Counsel | External | Coordination of Incident Response |
| | | Legal advice |
| | | Support internal legal team |
| Crisis Communications/Outside Public Relations | | Crisis messaging |
| | | Support internal PR team |
| eDiscovery | External | Investigation - legal/regulatory |
| Forensics/Security Consulting | External | Security expertise |
| | | Forensics/Remediation |
| | | Support internal IT/Security |
| Insurance Broker | External | Represents company in insurance purchasing/policies |
| Negotiation Services | External | Negotiation management |
| Print/Mailing/Notification | External | Print or online notification services |

FIG. 30E

| FACTS | Detail |
|---|---|
| Affected Entities | - |
| Groups Impacted by Incident | - |
| Parallel Process Available | - |
| Region of Incident | - |
| Risk to Organization | - |
| Threat Level | - |
| Time to Restore | - |
| Time/Date Incident Discovered | - |
| Type of Ransom | - |
| Type of System | - |

FIG. 30F

| SCOPE | Detail |
|---|---|
| Alabama | |
| Alaska | |
| Arizona | |
| Arkansas | |
| CA CPA | |
| CCPA | |
| Colorado | |
| Connecticut | |
| COPPA | |
| Delaware | |
| DFARS | |
| DPPA | |
| EU GDPR | |
| EU-US Privacy Shield | |
| FFIEC | |
| FISMA | |
| Florida | |
| Georgia | |
| GLB | |
| Hawaii | |
| HIPAA | |
| Idaho | |
| Illinois | |
| Indiana | |
| Iowa | |
| ISO 27701 | |
| Kansas | |
| Kentucky | |
| Louisiana | |
| Maine | |
| Maryland | |
| Massachusetts | |

| SCOPE | Detail |
|---|---|
| Michigan | |
| Minnesota | |
| Mississippi | |
| Missouri | |
| Montana | |
| Nebraska | |
| Nevada | |
| New Hampshire | |
| New Jersey | |
| New Mexico | |
| New York | |
| North Carolina | |
| North Dakota | |
| NY DFS | |
| NY SHIELD Act | |
| Ohio | |
| Oklahoma | |
| Oregon | |
| Pennsylvania | |
| Rhode Island | |
| South Carolina | |
| South Dakota | |
| Tennessee | |
| Texas | |
| Utah | |
| Vermont | |
| Virginia | |
| VPPA | |
| Washington | |
| West Virginia | |
| Wisconsin | |
| Wyoming | |

FIG. 30G

| ACTIONS | Detail |
|---|---|
| Classification | Determine the type of incident, type of information and type of risk caused by the incident for individuals and the organization. |
| Containment | Contain incident and determine what risk management measures should be put in place (e.g. call insurer) |
| Contractual coverage | Implement any necessary measures to ensure terms of contracts are followed during a breach |
| Determine incident cause | Determine what caused the breach by bringing in forensic experts where required and assigning relevant circumstances |
| Future remediation | Institute appropriate measures to make sure this does not happen again |
| Internal Reporting of Incident | Notify supervisory personnel and incident response team |
| Negotiating to secure keys | Implement any fact-finding process required or reporting to relieve the company of future liability where possible (e.g. determine if company has insurance), file necessary suits and determine the extent of financial damages if any |
| Notification to Affected Individuals and Public | Notify those potentially affected individuals while also appearing in the media as needed |
| Notification to Law Enforcement | Notify local and federal authorities depending on the scope of the incident and receive written stay of notice if necessary |
| Notification to leadership | Notify leadership after incident response team has assembled |
| Notification to Regulators | Notify regulators in the time period required by the regulatory body and provide appropriate supporting details |
| Restoration | In the case of a credit card breach, healthcare breach or other incident that is overseen by an industry association or agency, report incident in accordance with policy |

FIG. 30H

| GROUPS | Location | Responsibilities |
|---|---|---|
| Accounting | Internal | Estimate cost of trial vs settlement |
| | | Furnish evidence of company financial distress |
| | | Estimates expenses not covered by EPLI |
| Directors and Officers | Internal | Overall responsibility |
| | | Messaging to shareholders/customers |
| Human Resources | Internal | Human resource fact finding |
| | | Review/develop/augment severance package |
| IT Department | Internal | Recover digital trail |
| Legal | Internal | Determine suit validity/statute of limitations |
| | | Review plaintiff's contract |
| | | Approach insurance broker and carrier |
| | | Legal fact finding |
| | | Assess wrongdoing |
| Manager of Employee Filing Suit | Internal | Frunish documentation of employee performance |
| | | Provide cause of termination |
| | | Cooperates with investigation |
| Public Relations | Internal | Manage external communications as needed |
| | | Manage information leaks |
| Advocacy Group | External | Assists to broker settlement |
| | | Assists to manage reputation |
| Carrier | External | Reviews Claim and Policy |
| | | Insurance fact finding |
| | | Determines if occurance or claims-made policy |
| | | Describes coverage |
| External Investigator | External | Independent fact finding |
| | | Determines class-action potential |
| Insurance Broker | External | Represents company in insurance purchasing/policies |
| Outside Counsel | External | Review claims |
| | | Responds to plaintiff |
| | | Hires external investigator |
| | | Review proposed settlements |
| Social Listening Consultant | External | Analyzes stakeholders' perception of the company |

FIG. 30I

| FACTS | Detail |
|---|---|
| Advocacy Group Engaged | - |
| Alleged person(s) wrongfully harmed | - |
| Authorities Involved | - |
| Damages sought | - |
| Date of incident | - |
| Date of suit | - |
| Employees Named in Suit | - |
| Equal Opportunity Commission Officer Assigned | - |
| Local Laws on Matter | - |
| Location of incident | - |
| Plaintiff | - |
| Plaintiff Counsel | - |
| Type of suit | - |
| Within Statute of Limitations | - |

FIG. 30J

| SCOPE | Detail |
|---|---|
| Australia Equal Opportunity Act 1977 | |
| Australia Racial Discrimination Act 1975 | |
| EU Equal Treatment Directive | |
| EU Employment Equality Directive | |
| EU Equality Act 2010 | |
| EU Human Rights Act - Article 14 | |
| EU Racial Equality Directive | |
| Ireland's Maternity Protection Acts 1994 and 2004 | |
| Ireland's The Employment Equality Acts 1998-2015 | |
| UK Employment Equality Regulations 2003 & 2006 | |
| UK Equal Pay Act 1970 | |
| UK Race Relations Act 1965 and the Race Relations Act 1968 | |
| UK Sex Discrimination Act 1975 | |
| US Age Discrimination in Employment Act of 1967 (ADEA) | |
| US Americans with Disabilities Act of 1990 | |
| US Equal Pay Act of 1963 (EPA) | |
| US Genetic Information Nondiscrimination Act of 2008 (GINA) | |
| US Pregnancy Discrimination Act | |
| US Sections 102 and 103 of the Civil Rights Act of 1991 | |
| US Sections 501 and 505 of the Rehabilitation Act of 1973 | |
| US Title VII of the Civil Rights Act of 1964 | |

FIG. 30K

| ACTIONS | Detail |
|---|---|
| Determine existing protections | Evaluate existing company protections in place from the suit |
| Determine exposure | Estimate the potential costs should the suit go to court |
| Determine legal strategy | Carefully construct legal strategy so that there is low risk of public blowback |
| Determine potential scale of suit | Engage in a fact-finding mission about similar complaints at company to understand extent of potential suit (i.e. individual complaint or potential class-action) |
| Discovery | Identify circumstances that led to the liability |
| Engage advocacy groups | Work with advocacy groups to manage external dialog |
| Manage reputation | Engage with media to mitigate reputational damage |
| Negotiation | Discuss potential severance and/or settlements |
| Notification to human resources | Notify human resources that a suit was brought and inform them to initiate diligence |
| Notification to named employees | Notify employees named in the suit |

FIG. 30L

CLOUD-BASED MULTI-TENANCY COMPUTING SYSTEMS AND METHODS FOR PROVIDING RESPONSE CONTROL AND ANALYTICS

CROSS-REFERENCE TO RELATED APPLICATIONS

N/A

TECHNICAL FIELD

The present disclosure relates generally to response control and analytics and, more specifically, to cloud-based multi-tenancy computing systems and methods for providing response control and analytics in order to address events, including but not limited to, cyber events, cyber threats, data breaches, business disruption or interruption events, any event that is atypical for a business which requires a response, and catastrophic disasters.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for providing response control and analytics. In general, the disclosed methods and systems are directed to addressing events, including but not limited to cyber events, ransomware, and the like.

According to one example embodiment of the disclosure, systems and methods for providing response control and analytics are disclosed. An exemplary computer-implemented method for providing response control and analytics comprises receiving, via a cloud network, data from a best practices template of a stakeholder, the stakeholder represented as a stakeholder tenant provisioned by a response system; receiving, by a processor of the response system, via the cloud network, a stakeholder's request for a provisioning of a client tenant for a client; receiving a user verification of the client from a service provider via the cloud network, the user verification including a security token that is received by a processor of the response system; providing a response center to the client by the response system, to be displayed on a client's computing device, the response center provided on a graphical user interface, the response center implementing the best practices template, the graphical user interface comprising a menu of actions for the client to perform in response to an event; receiving a plurality of client preferences regarding the response center, the client preferences include client analytics and feedback, based on at least one of the client's responses to past events and the client's insights of what actions are needed to respond to the event; based on one or more of the plurality of client preferences, customizing the response center room, the customized response center initially placed in a standby mode, the standby mode indicating that the client is not currently responding to an event; upon receiving client input through the graphical user interface, activating the customized response center when an event has occurred; providing a notification to the stakeholder when the customized response center is activated by the client; automatically re-populating the menu of the graphical user interface of the activated response center with suggested actions for the client to perform in response to the event, the suggested actions selected from least one of the best practices template of the stakeholder and the client's preferences; capturing a first set of data based on activities that occur in the activated response center related to the client's actions taken in response to the event; generating a first set of analytics based on the captured first set of data, the analytics based on one or more of dates, time stamps and metadata of the captured data of a single client tenant; capturing a second set of data based on activities that occur in a plurality of response centers s of client tenants related to the clients' actions taken in response to the events that occurred to them; generating a second set of analytics based on the captured second set of data, the analytics based on one or more of dates, time stamps and metadata of the captured data of the plurality of client tenants; and based on the first and second set of analytics produced by the response system, generating and transmitting an updated menu of suggested actions for responding to a future event, to one or more of the clients.

An exemplary computer-implemented system for providing response control and analytics comprises means for receiving, via a cloud network, data from a best practices template of a stakeholder, the stakeholder represented as a stakeholder tenant provisioned by a response system; means for receiving, by a processor of the response system, via the cloud network, a stakeholder's request for a provisioning of a client tenant for a client; receiving a user verification of the client from a service provider via the cloud network, the user verification including a security token that is received by a processor of the response system; means for providing a response center to the client by the response system, to be displayed on a client's computing device, the response center provided on a graphical user interface, the response center implementing the best practices template, the graphical user interface comprising a menu of actions for the client to perform in response to an event; receiving a plurality of client preferences regarding the response center, the client preferences include client analytics and feedback, based on at least one of the client's responses to past events and the client's insights of what actions are needed to respond to the event; based on one or more of the plurality of client preferences, means for customizing the response center, the customized response center initially placed in a standby mode, the standby mode indicating that the client is not currently responding to an event; upon receiving client input through the graphical user interface, means for activating the customized response center when an event has occurred; providing a notification to the stakeholder when the customized response center is activated by the client; means for automatically re-populating the menu of the graphical user interface of the activated response center with suggested actions for the client to perform in response to the event, the suggested actions selected from least one of the best practices template of the stakeholder and the client's preferences; means for capturing a first set of data based on activities that occur in the activated response center related to the client's actions taken in response to the event; generating a first set of analytics based on the captured first set of data, the analytics based on one or more of dates, time stamps and metadata of the captured data of a single client tenant; means for capturing a second set of data based on activities that occur in a plurality of response centers s of client tenants related to the clients' actions taken in response to the events that occurred to them; generating a second set of analytics based on the captured second set of data, the analytics based on one or more of dates, time stamps and metadata of the captured data of the plurality of client tenants; and based on the first and second set of analytics produced by the response system, means for generating and transmitting an updated menu of suggested actions for responding to a future event, to one or more of the clients.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings.

FIG. 25 illustrates an exemplary graphical user interface for adding a client, in accordance with certain embodiments of the present disclosure.

FIGS. 26A, 26B, and 26C depict exemplary lists of the types of information that can be found in an exemplary stakeholder's best practices template, in accordance with certain embodiments of the present disclosure.

FIGS. 28A, 28B, and 28C depict exemplary lists of the types of information that may be furnished by a stakeholder as part of their best practices template for a high net worth individual or family, in accordance with certain embodiments of the present disclosure.

FIG. 29 illustrates an exemplary graphical user interface for a policy tab in a response center, in accordance with certain embodiments of the present disclosure.

FIGS. 30A-30L depict exemplary lists of the different types of information that may be furnished by a stakeholder as part of their best practices template for directors and officers, in accordance with various embodiments of the present disclosure.

DETAILED DESCRIPTION

Figure 1:
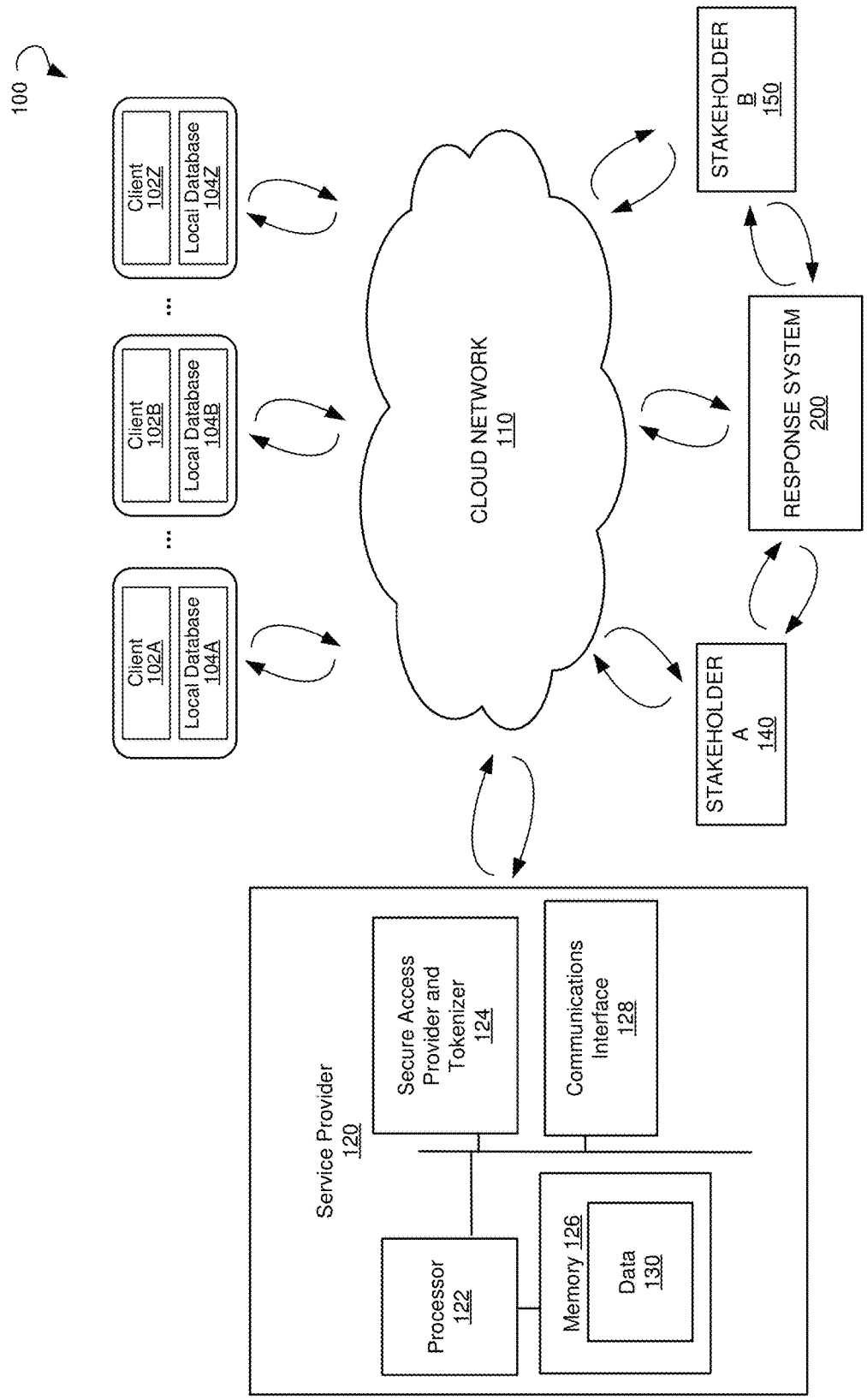
FIG. 1 illustrates an environment within which systems and methods for providing response control and analytics are implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Traditionally, to their detriment, businesses respond very slowly to events that may pose a threat to those businesses. A non-limiting list of such events include cyber breaches, cyber threats, data breaches, ransomware, security breaches, loss of data, catastrophic events (such as a plane crash, a fire, a shipwreck, an earthquake, a tornado, or a flooding), any insurable event, cyber intrusions, natural disasters, healthcare response, lawsuits from employees/shareholders, regulatory investigations, supply chain disruptions, pandemics, food safety, product recall, crisis management, any other type of damage, destruction or disruption to a business and any other atypical event to which a business must respond. In some embodiments of the present disclosure, an event may be any incident outside the normal operations of a company where the company has to respond using a combination of internal stakeholders and external service providers and/or third parties, in a timely fashion, effectively and efficiently.

One of the principal reasons why businesses respond so slowly to such events is that businesses typically do not have a response plan to respond to these events in place. Instead, a typical business is unprepared to respond to any type of event and when it is presented with an event, the business itself and its people act in an ad-hoc manner, with information being shared in a disorganized fashion via a flurry of documents, emails and phone calls which typically are not logged in any manner. Once an event is discovered, this information must be shared within the business or organization, meaning human resources people, general counsel, lawyers, and management teams, IT, Security, Legal, Management, Business Units, Board, Finance, Supply Chain, Risk Management, PR, Marketing, Customer Management/Support, Sales, etc. must be contacted. The business may also contact their secondary stakeholders, such as their Outside Legal Counsel, Consulting Firms, Crisis Management firms, Suppliers, Customers, Insurance Companies, Banks, Regulators, Governments, heir risk advisors, their consulting firms, etc. to inform them of the event. Unfortunately, the typical business fails to coordinate in their response to the event, with their internal people and their external stakeholders (including but not limited to forensics, e-discovery firms, and call center).

Furthermore, a business may respond to an event in a problematic manner which can open itself to even further issues, such as litigation issues or a public relations nightmare. For instance, a CEO of the company may cause even more problems by providing factually inaccurate quotes in a press release about the event, which may haunt the company in later litigation proceedings. Again, the inability to properly respond to an event is largely due to the lack of a response plan in place.

To provide a business with a response plan, a system for providing response control and analytics is provided. This system helps to reduce liability and the business (client) has a response plan that is always "on" and continually being updated. With this response plan in place, a client can rest assured that they have a plan that provides an instant, automated response to an event, with the best resources and tools in place, as well as ways for the client to benchmark themselves on how they responded to an event and how they can improve on their responses to events in the future. The stakeholder typically helps to set up its clients' response centers because (1) events may never happen to some of the stakeholder's clients and (2) the clients typically do not have the expertise or knowledge on how to populate their own response centers.

In some exemplary embodiments of the present disclosure, a system for providing response control and analytics is implemented using a cloud service provider with a serverless architecture that relies upon multitenancy. At a high level, the multi-tenancy system provisions any number of tenant and various types of tenants. For instance, as will be described later herein in greater detail in relation to FIGS. 1 and 3, client tenants, third party tenants and stakeholder tenants may be provisioned by the cloud-based multitenancy system. In an exemplary system, the system may provision millions of client tenants. Those client tenants represent the clients of a stakeholder. The stakeholder is represented by a stakeholder tenant, as provisioned by the system. The stakeholder provides services, products and the like to its clients, which are the stakeholder's customers. A non-limiting exemplary list of stakeholders include banks, regulators, and rating agencies. For instance, if the stakeholder is an insurer, the insurer provides insurance coverage to its clients which are typically businesses, companies or organizations. Although throughout the present disclosure the term "stakeholder" will be used throughout, one skilled in the art will recognize that any type of external stakeholder or an external provider to a client may be used in place of the term "stakeholder" and that the present disclosure is not limited to merely a particular type of stakeholder but instead the present disclosure is suited for any type of stakeholder that provides products and/or services to its customers (clients).

In some embodiments, the system is provided by an organization (stakeholder) to the organization experiencing the event (client). Furthermore, for purposes of dealing with the event there may be other organizations (service providers) that also have access to the system. Finally, a third party, which may be invited typically by a client to view, edit or otherwise access the data of a client, may be provisioned by the system as a third party tenant. The exemplary system is a platform that is customizable and configurable on at least two levels. First the platform is customizable because it can implement a stakeholder's best practices template. The stakeholder can provide and codify information about their best practices in the form of a best practices template by industry, geography, revenue band, and the like. The best practices template may provide the stakeholder's answers to such questions, who needs to be involved, who has what responsibilities, what are the facts to be gathered, what will impact likelihood, what actions or tasks need to be done, etc. Also, the best practices template might also include a pre-defined list of service providers pre-negotiated or known to the stakeholder. Thus, the stakeholder's client does not have the burden of trying to find to these service providers when an event has happened.

Second, the platform is customizable because a client tenant can edit, modify, add or make any other configuration changes to its response center based on their own preferences. Preferably, the system comprises a single version of the platform for all end users. All of the system's end users may obtain updates in lockstep releases through code or through AB testing. AB testing is the opposite of lockstep. In AB testing, a subset A of clients obtain one update while another subset B of clients receive another update. Then the stakeholder can see which subset does better in order to judge the efficacy of the two updates.

The system relies upon the cloud-based environment and the multitenancy architecture to ensure that each client tenant has a customized response plan which can be depicted as a response center through graphical user interfaces (GUIs) as shown on a client's computing device. A response center may be viewed as a secure, centralized environment for a client tenant in which the response to an event can be collaborated on, shared, acted upon, monitored and analyzed by internal and external parties, including third parties and stakeholders. Furthermore, each client's response plan is always "on," in a standby mode waiting for an indication that an event has occurred. Once an event has occurred, the client can activate their response center via the GUIs as one of the first steps towards responding to the event at hand. Also, each client tenant is secure and separate from third parties and stakeholders. Furthermore, each client tenant with their response plan in place is also secure and separate from the rest of the client data, client server(s), client email servers and computerized workspace. Thus, if a data breach occurs on a client server or the client's mail server is down, the client can rest assured that their response center (which is provided by this serverless, cloud-based multitenancy system) has not been breached and remains safe and secure apart from the compromised client server.

FIG. 1 illustrates an environment 100 within which the systems and methods for providing response control and analytics can be implemented, in accordance with some embodiments. A response system 200 may include a cloud-based distributed application, which may include a service provider (such as a cloud provider) 120 and one or more client applications residing on a client device associated with one or more clients 102A . . . 102Z (also referred to herein as client tenants 102A . . . 102Z). A client user may communicate with the system 200 via a client application available through the client device. In other embodiments, the system 200 may be a cloud-based application with one or more components residing on the service provider 150 and accessible via a web browser on the client device.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network (MAN), a Virtual Private Network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network (ISDN) line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an infrared port, a Small Computer Systems Interface connection, a Universal Serial Bus (USB) connection or other wired or wireless, digital or analog interface or connection, mesh, or Digi® networking. The network 110 may include a network of data processing nodes that are interconnected for the purpose of data communication. The network may include a Software-defined Networking (SDN). The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

As mentioned earlier, in some exemplary embodiments, the system for providing response control and analytics (namely the response system 200) relies upon the benefits of a cloud network 110 and multitenancy to provision any number and types of tenants. The response system 200 may be a platform for one or more external stakeholders (such as insurers) to provide response centers to their clients. Although FIG. 1 depicts two stakeholders, Stakeholder A 140 and Stakeholder B 150, communicatively coupled with the response system 200, and three clients 102A, 102B, and 102Z, one skilled in the art will recognize that FIG. 1 is for illustrative purposes only since any number of external stakeholders and any number of clients can be communicatively coupled with the response system 200 via the cloud network 110.

Still referencing to FIG. 1, the response system 200 provisions stakeholder tenants for both the Stakeholders A 140 and B 150, and the response system 200 provisions client tenants 102A, 102B, and 102Z. Also, each of the client tenants 102A, 102B, and 102Z may include their own local databases, 104A, 104B, and 104Z, respectively. It will be appreciated that the present disclosure allows for the response system to be architecturally organized in a variety of fashions, and therefore not limited to where the client tenants have their own local databases. For instance, in some embodiments, the client tenants may share a pooled database where the response system platform is architecturally organized in a pooled fashion such that multiple tenants have their information stored in a shared database using a single schema, which will be described in further detail later herein. The local databases 104A, 104B, and 104Z may be more focused on the issues that the client organization has or is dealing with at the time. These local databases 104A, 104B, and 104Z will be discussed at length later herein when analytics of key metrics are described. The response system 200 may also provision optional third party tenants (not depicted in FIG. 1) for third parties that are invited by the client to view, edit or otherwise access a client's response center and data stored in the client's local database. Alternatively, a third party can be invited by a client to work on an action in response to an event. If the third party has the permission to do so, the third party can interact with the response center based on the access control granted to them. A third party tenant can view all the response centers to which they are invited. For instance, a client can invite third parties, such as lawyers, into their response center to participate in responding to an event. The response system 200 manage those third parties, as well as the internal users of the client, through access controls and permissions associated with the client's response center, designating actions. One skilled in the art may recognize that a third party can be a service provider, but for the illustrative purposes of FIG. 1, a cloud service provider and third parties are shown as separate entities to describe some non-limiting embodiments of the present disclosure.

The response system leverages the use of the service provider 120 (such as a cloud service provider with a data center), for the service provider's managed services. In general, the service provider 120 comprises a processor 122, a memory 126 for storing data 130 which may be shared with the response system, a secure access provider and tokenizer 124 and a communications interface 128. The processor 122 will help to control data traffic and process data as requested by the response system 200. The processor will receive and transmit data with the response system 200 through the cloud network 110. The secure access provider and tokenizer 124 of the service provider 120 will verify the identity of stakeholders, clients and third parties who request access to the response system 200. The secure access provider and tokenizer 124 will generate and transmit security tokens to the response system 200 when identification is verified of a given party, such that data can be transmitted in encrypted form via the cloud network to the receiving party. The communications interface 128 allows for the service provider to communicate with any of the components within the environment 100, but primarily the service provider will communicate with the response system 200. The network 110 can include any of the network(s) disclosed infra.

Figure 2:
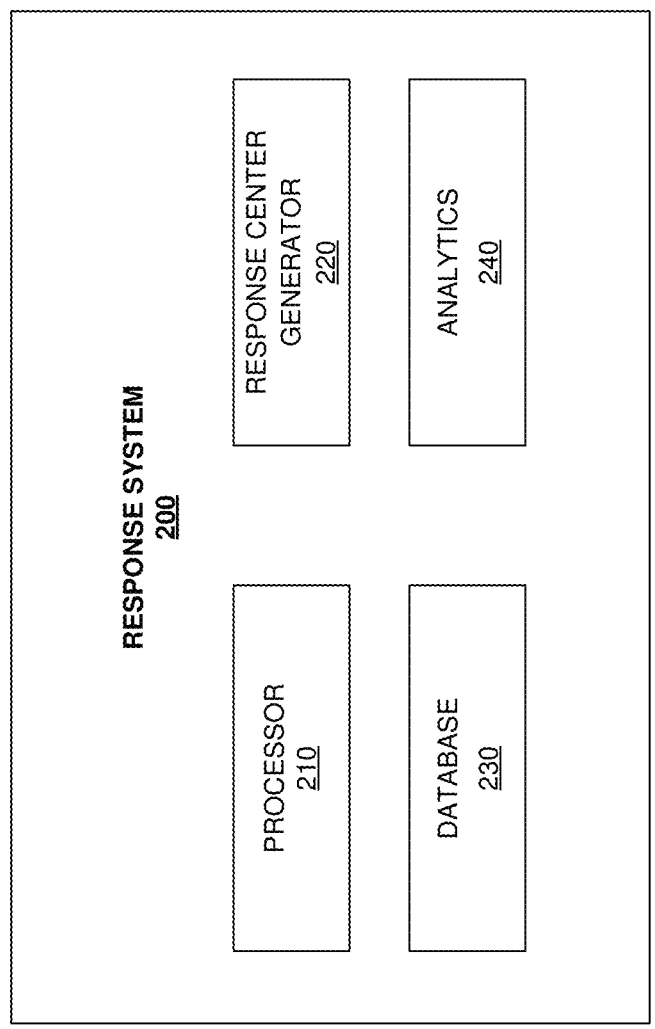
FIG. 2 is a block diagram showing a response system in accordance with some embodiments of the present disclosure.

FIG. 2 shows a detailed block diagram of the response system 200 for providing response control and analytics, in accordance with an example embodiment. The system 200 may include a processor 210, a response center generator 220, and an optional database 230, and an analytics component 240. The processor 210 is configured to receive a best practices template by a stakeholder. The stakeholder's best practices template will be described later herein. A non-limiting example of a stakeholder's best practices template is provided in FIGS. 26A, 26B and 26C.

The processor 210 can utilize the stakeholder's best practice template to construct and generate a response center via the response center generator 220. For instance, a response center provided by the response center generator 220 for a client can be viewed on a client's computing device. Typically, the response center is displayed on one or more graphical user interfaces, and the response center can comprise information regarding one or more events and the stakeholder's best practices template.

The processor 210 can also receive a plurality of client preferences, which may include changes, modifications, additions or configurations of the client's response center. Again, with the help of the response center generator 220, the processor can implement the plurality of client preferences, thereby updating the client's response center.

The processor 210 further receives a client input through a graphical user interface of the client's response center, where the client input activates a dormant response center when an event has occurred. A response center is usually dormant or on standby, waiting for an event to occur. Once the processor 210 receives this information that a client's response center is active, it provides and transmits a notification, via the cloud network, to a stakeholder of the client that the client's response center is now active.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, cloud-based applications, and/or browser or browser-enabled applications.

The database 230 may be configured to store one or more best practices templates from one or more stakeholders, as well as client preferences from a plurality of clients of the one or more stakeholders regarding their individual response centers. The database 230 may also be configured to store the identity verification results provided by the service provider, after the service provider has verified the identity of a system user, whether they be a third party, a client or a stakeholder.

The database 230 also stores analytics which are generated by the analytics component 240 (which will be discussed in greater detail later herein). The analytics component 240 can determine analytics based on key metrics. Those key metrics include but are not limited to, the time stamps, the dates and the loggings of any action, task, communication, data collection, and the like taken using the response center. The analytics component 240 may determine a first set of analytics based on a client's execution of tasks in response to a particular event. This first set of analytics may be based, in part, on the data stored on the client's local database in their response center and reports therefrom. The analytics component 240 may also determine a second set of analytics based on a plurality of clients' execution of tasks in response to one or more events. For example, if a stakeholder wants to determine how much time it took for its five clients to respond to an earthquake event, then the analytics component 240 can provide this information in a set of analytics. Based on the first and second sets of analytics provided by the analytics component 240, the response center may be updated by the response center generator 220. Finally, the analytics component 240 can provide a third set of analytics based on a global database comprising a corpus of event response reports furnished by related businesses.

Figure 3:
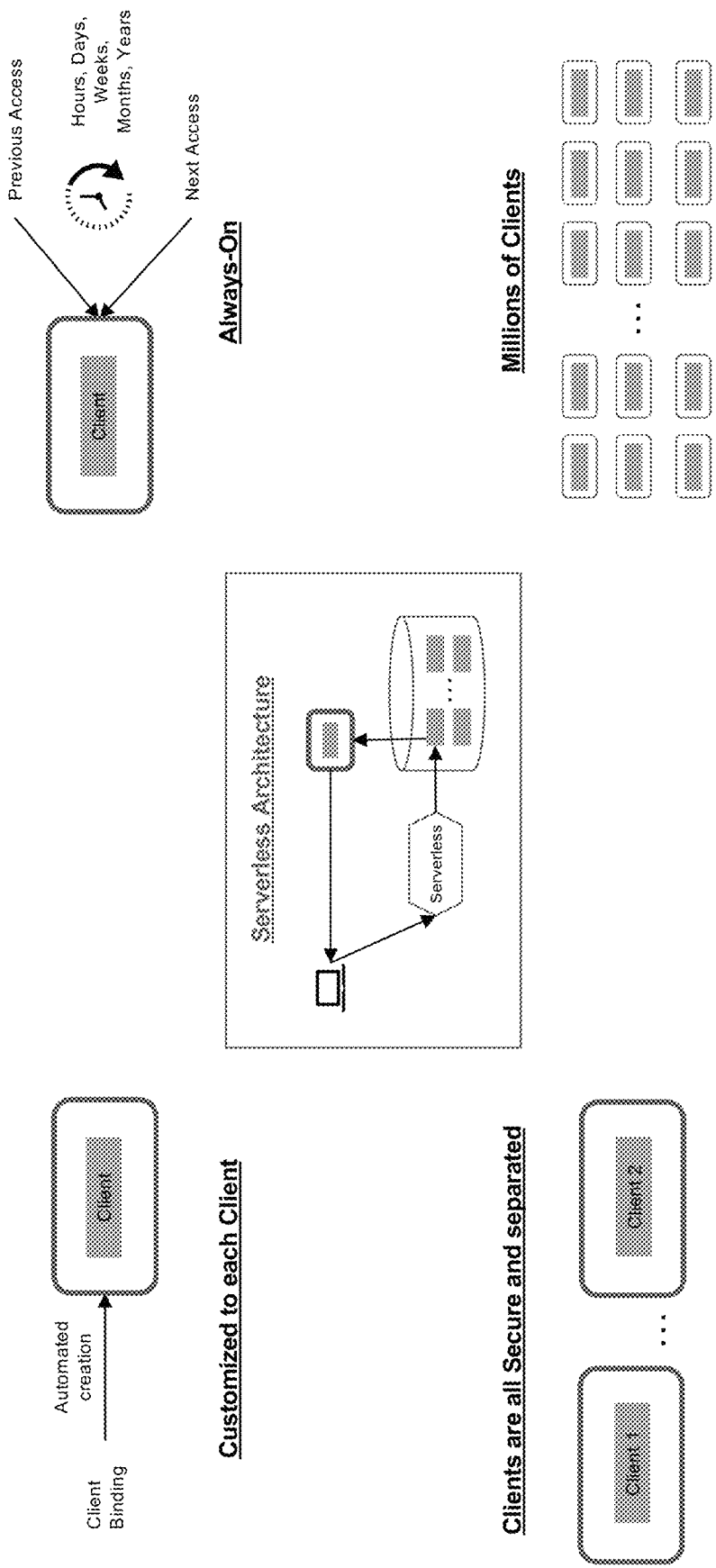
FIG. 3 is a block diagram depicting an exemplary serverless architecture of a response system in accordance with some embodiments of the present disclosure.

FIG. 3 is a block diagram that highlights several of the important attributes associated an exemplary for providing response control and analytics in accordance with the present disclosure. In some embodiments, the system has a serverless architecture that allows for the provisioning of multiple tenants in response to requests, by using cloud-based service providers. However, one skilled in the art can recognize that in other embodiments, the system is not limited to serverless architectures, and in fact, the system itself can be based on a server-based architecture. In other words, the system's compute could be ephemeral and elastic (serverless) always on and elastic pooled (containers with elastic capabilities) or dedicated to the client and always on. Further details regarding these various architectural embodiments are provided later herein.

Returning to the details of the exemplary response system, once the system platform is established with the stakeholder, the stakeholder's client can provide information to request access to the platform. The platform customizes the response center for the client based on the stakeholder's best practices template and the client's preferences or customization of its response center. Each client is secure and separate. The system can service multiple clients and multiple stakeholders.

The system platform can be implemented in a variety of ways or modes. For instance, in some embodiments, the response system is "always on" which could mean one of three things. A first possibility is that dedicated computer resources can be implemented in the response system such that they are "always on" and belong to a selected client X. A second possibility is that pooled compute resources are "always on" in that those pooled compute resources handle the client requests. A third and final possibility is that ephemeral computer resources can spin up or activate to service a single request. That is, tenant provisioning can happen completely "on the fly."

In further embodiments, the system platform can be implemented such that it can be activated ("up and running") within a short period of time, such as a day or two days. In such embodiments, this activation within a short period of time could mean one of two things. A first possibility is that the tenant provisioning performed by the response system is done manually or in a semi-automated way. A second possibility is that there is likely some dedicated compute, API paths and/or persistence resources that are designated for the client.

In yet further embodiments, the system platform can be implemented such that it can be activated ("up and running") within minutes, which could mean that either tenant provisioning is automated or certain computer resources and/or persistence resources are created or provisioned for a tenant.

Three further architectural embodiments of a response system are provided in accordance with the present disclosure. In some embodiments, for instance, the response system can be architecturally organized such that a separate database is provided for each tenant in a silo fashion. In other embodiments, the response system can be architecturally organized in a bridge fashion such that a single database is used to store data for multiple tenants having multiple schemas. Finally, in further embodiments, the response system can be architecturally organized in a pooled fashion such that multiple tenants have their information stored in a shared database using a single schema.

The fact that the response system can be architecturally organized in a variety of ways can also be helpful in encryption of data. For instance, in the pooled model architecture, one can utilized shared encryption where a single database table is encrypted using a shared master key. Also, using the pooled model, encryption per tenant can be accomplished, such that the shared single database can be encrypted using a master key and rows can be encrypted utilizing a given tenant's key. In other words, each tenant has its own encryption key.

Furthermore, in the silo model, one can accomplish encryption per tenant such that there is a database table for each tenant, and each table is encrypted using its own key. Also, an optional additional layer of row encryption can be applied on one or more of the tenants' database tables, which in turn minimizes the possibility of an administrator view attack vector.

In some embodiments, methodologies of encryption hierarchy can be utilized in the response system. In a non-limiting example, all data in transit in the response system can be transported over HTTPS and TLS, while the data at rest can be encrypted using (a) a shared key for all tenants, (b) a key dedicated for each tenant (key per tenant) or (c) a shared key for all tenant plus a key per tenant.

Figure 4:
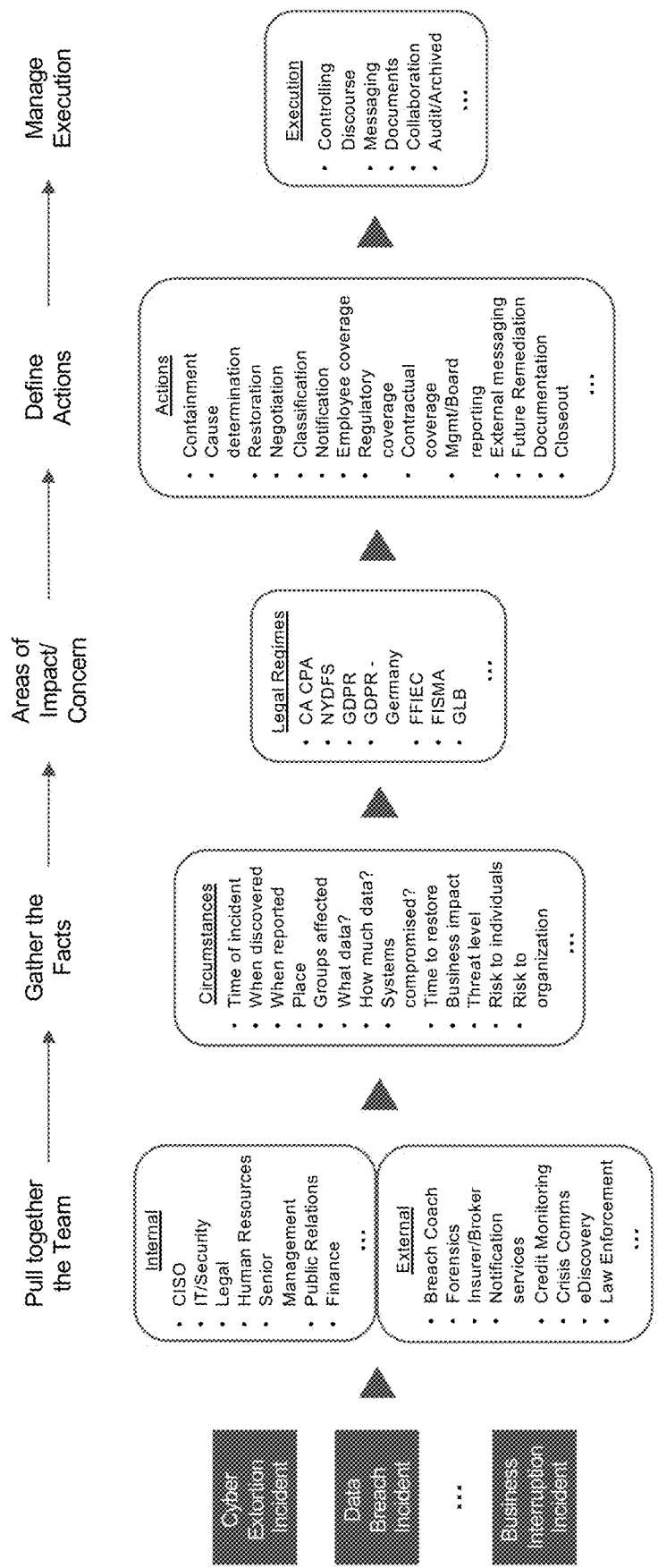
FIG. 4 illustrates an exemplary workflow provided by a response system.

FIG. 4 is a block diagram of an exemplary workflow that is utilized by the system for providing response control and analytics. When an event (sometimes called an incident) occurs, whether it be a cyber extortion, a data breach, a business interruption event, or something else, the system platform has a specific workflow of steps which will be displayed in certain exemplary GUIs later herein. At a high level, the system, through its graphical user interfaces, allows a client to designate its response team, which will include both internal and external team members. After the response team is designated, then certain facts regarding the event are gathered. The areas of impact or concern are determined, which will include determining the legal regime involved (such as the laws of the countries like Germany or the US, or particular laws, such as the European GDPR). Then actions are defined. Those actions may be based on the best practices template provided by the stakeholder, which was used in generating the client's response center. Those actions may also be based on the client's own response preferences. For instance, the client may already have experienced an earthquake, and therefore the client may have implemented their own client preferences on what actions they will perform in order to address the earthquake event. Finally, the system manages the execution of the response to the event.

As described above, the response system utilizes a cloud-based multi-tenancy architecture in order to provide response control and analytics to various parties, such as stakeholders, clients and third parties. The response system provides roles and access controls based on the identity of an entity or party. For instance, the response system can assign a persona or a role to a tenant of a stakeholder, a client or a third party, which allows the system to toggle or enable modules based on those personas or roles.

In some embodiments, the stakeholder will send a request for the response system to provision a client tenant with some basic information about the client (such as contact information, phone number, etc.). Upon receipt of that request, the response system will provision the client tenant. The client tenant will include a response center which may be considered as a digital centralized secure "war" room where a client such as an organization or a business is provided tools and resources to respond to an event. The stakeholder will provide the response system with its current best practices template which will be utilized by the response system to configure the initial response center for the client. From time to time the stakeholder may update their current best practices template, which is transmitted to the response system such that the response system can update the response centers assigned to the clients of the stakeholder.

A stakeholder's client can request through the stakeholder for access to its response center and upon verification by a service provider (such as service provider 120 in FIG. 1) the client can sign up for account access. The client's response center is generated by the response system. Once the response system provides access to the client, then the client can log onto their response center through their computing device and they can edit, modify, change or otherwise customize or configure their response center in accordance with their own client preferences. For instance, the administration for that client can set up and populate plans and add or remove internal and external parties. This will be discussed later herein in relation to the Admin tab of the dashboard provided to the client of their response center.

From time to time, the client may update their client preferences. For instance, the client may receive analytics and feedback from its internal team and/or from the response system based on their handling of the past events. Those client preferences are transmitted to the response system and stored in the database of the response system, which then updates the response center in accordance with the client preferences. In other words, in some embodiments, the response center undergoes two layers of configuration (first, based on the current stakeholder's best practices template and second, based on the client's current preferences, analytics and feedback).

Because the stakeholder provided the initial request for their client to have access to a response center, the response system knows the source of the client and can associate or relate the stakeholder and the client, such that changes to the client or the client's response center will be provided to the stakeholder if needed. Also, changes to the stakeholder's best practices template will be automatically implemented to the client's response center, because again the response system has associated the stakeholder with the client and knows of that relationship.

Thus, for any event for which a client has activated their response center, the response system will notify the stakeholder through the stakeholder's dashboard of their application that the client's response center is now active. If the stakeholder is an insurer and if requested by an insurer, an insurance claim form will be automatically generated or a claim loss interface will appear, upon activation of a client's response center. Because there is a link or association between the client and the stakeholder, any metrics, such as cost, time, progress, and the like, can be captured as the client's team is assembled and actions are taken in response to the event, as reflected in the response center. Any activity happening in the response center can be emitted from the client tenant to the stakeholder tenant by the response system. Metrics can be processed such that the analytics platform of the response system can generate analytics based on such metrics. The analytics can be aggregated across a plurality of stakeholders or potentially the stakeholder will receive only those analytics that are based on the metrics from their own client base.

As with most multi-tenancy systems, the response system is structured such that users cannot cross tenancy boundaries. In other words, in some embodiments, a stakeholder is not accessing data straight from the client tenant, but rather the stakeholder is accessing data in their own tenant. In other embodiments, a stakeholder may also access data in a client tenant when a system user that is owned by the stakeholder tenant is granted access by the client tenant. This way the tenant boundary is not crossed by any one single user and all the data does not have to be duplicated. The response system provides access control to the tenants based on their identity and the permissions that were granted to the tenant. Thus, for instance, if a third party is a user of a client tenant and is invited to the client's response center, then the response system emits events from the tenant to the third party module, which can generate invites and notifying user. The third party tenant on their GUI dashboard can view all the client response centers to which they have been invited.

For authentication, the response system can authenticate users, authorize users and grant access through user identity and authentication. With the help of the service provider and the cloud network, the response system can obtain verification of user identity via multi-factor authentication, and the response system can include its own security policies. In further embodiments, for authentication in order to access the response system, an authorization token can be embedded in a secured link.

Once a user's identity is verified, preferably by the service provider, the response system generates secure access tokens that are associated with security policies that allow users to view and/or edit information that they have been granted access via permissions.

It should be noted that the response system uses a managed identity service for verification of a user's identity A user has a single source of identity on the system platform. Third parties have one login across all tenants, and thus a third party also has a single identity. Access tokens are created based on the user's identity. Role based security policies are applied. Entities are secured by role-based security. When a user requests to perform operations (read/write/delete) role-based access control verifies that the user has been granted permission for the operation. Permission can be revoked by the client at any time While a user has a single source of identity access tokens are managed per tenant. This means that a single access token cannot access data from multiple tenants. Access tokens for a session are exchanged by an authorization component of the response system, when a third party accesses rooms in different tenants to create a seamless user experience, while still maintaining data isolation and maintaining tenant boundaries.

It also should be noted that for encryption purposes, data files that are stored by the response system are given a unique identifier, such that one would have to access two systems in order to breach and gain access to that data file stored in the response system. In other words, when a user uploads a file in the application, two operations occur. First, the file content is read, encrypted and sent to a data storage bucket to a service provider, such as Amazon, where it is given a unique id. The upload operation then returns that ID and adds an entry into the database that associates that unique ID with the user and original file name. From a practical standpoint what this means is that an uploaded file is obfuscated or hidden behind a unique ID where the only access to that ID is via the system database, which has its own security and encryption. The data from the uploaded file is not stored in a way that would be easy for an attacker to gain access.

Figure 5:
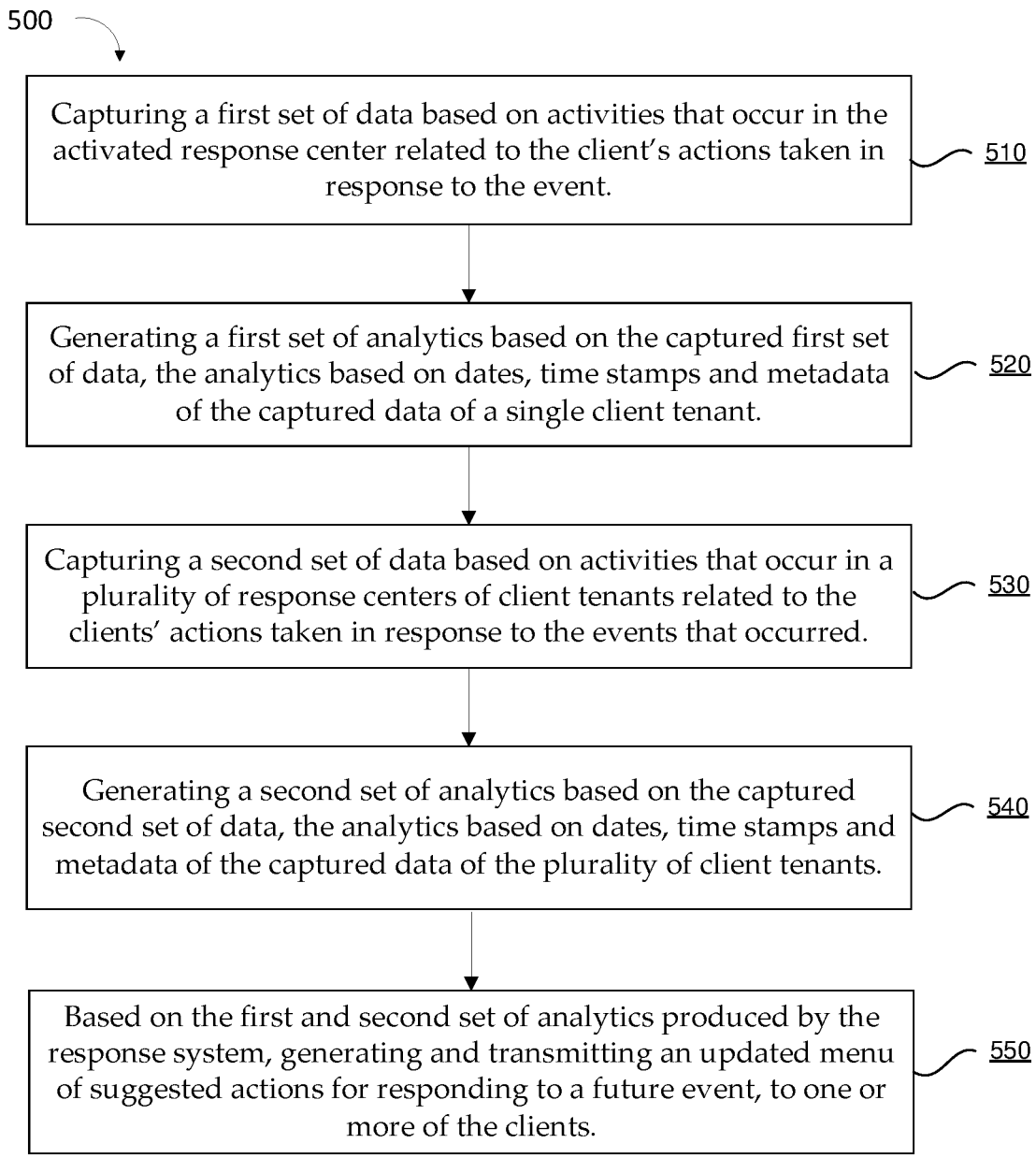
FIG. 5 illustrates a process flow diagram showing a method for providing response control and analytics.

FIG. 5 is a process flow diagram showing a method 500 for providing response control and analytics. At operation 510, a first set of data is captured by the response system. The first set of data is based on activities that occur in the activated response center related to the client's actions taken in response to the event. In some embodiments, this first set of data is captured by the response system and stored either one or both of a database of the response system and a local database. At operation 520, a first set of analytics is generated by the response system. The first of analytics is based on the captured first set of data, the analytics based on one or more of dates, time stamps and metadata of the captured data of a single client tenant. At operation 530, a second set of data is captured based on activities that occur in a plurality of response centers of client tenants related to the clients' actions taken in response to the events that occurred to them. In some embodiments, this second set of data is captured by the response system and stored in a database of the response system. At operation 540, a second set of analytics is generated based on the captured second set of data, the analytics based on one or more of dates, time stamps and metadata of the captured data of the plurality of client tenants. Then, at operation 550, based on the first and second set of analytics produced by the response system, an updated menu of suggested actions for responding to a future event is generated and transmitted to one or more of the clients. As an optional step (not shown) a third set of data is captured based on global activities that are determined and derived from news items, press release, and other external sources of information, regarding external businesses or organizations and their responses to events that occurred to them. In some embodiments, this third set of data is captured by the response system and stored in a global database of the response system. As a further optional step, based on the first, second and third sets of analytics produced by the response system, an updated menu of suggested actions for responding to a future event is generated and transmitted to one or more of the clients. These may be considered as feedback loops for the response system to provide and distribute analytics, feedback, suggested actions and updated information to both stakeholders and their clients.

Figure 6:
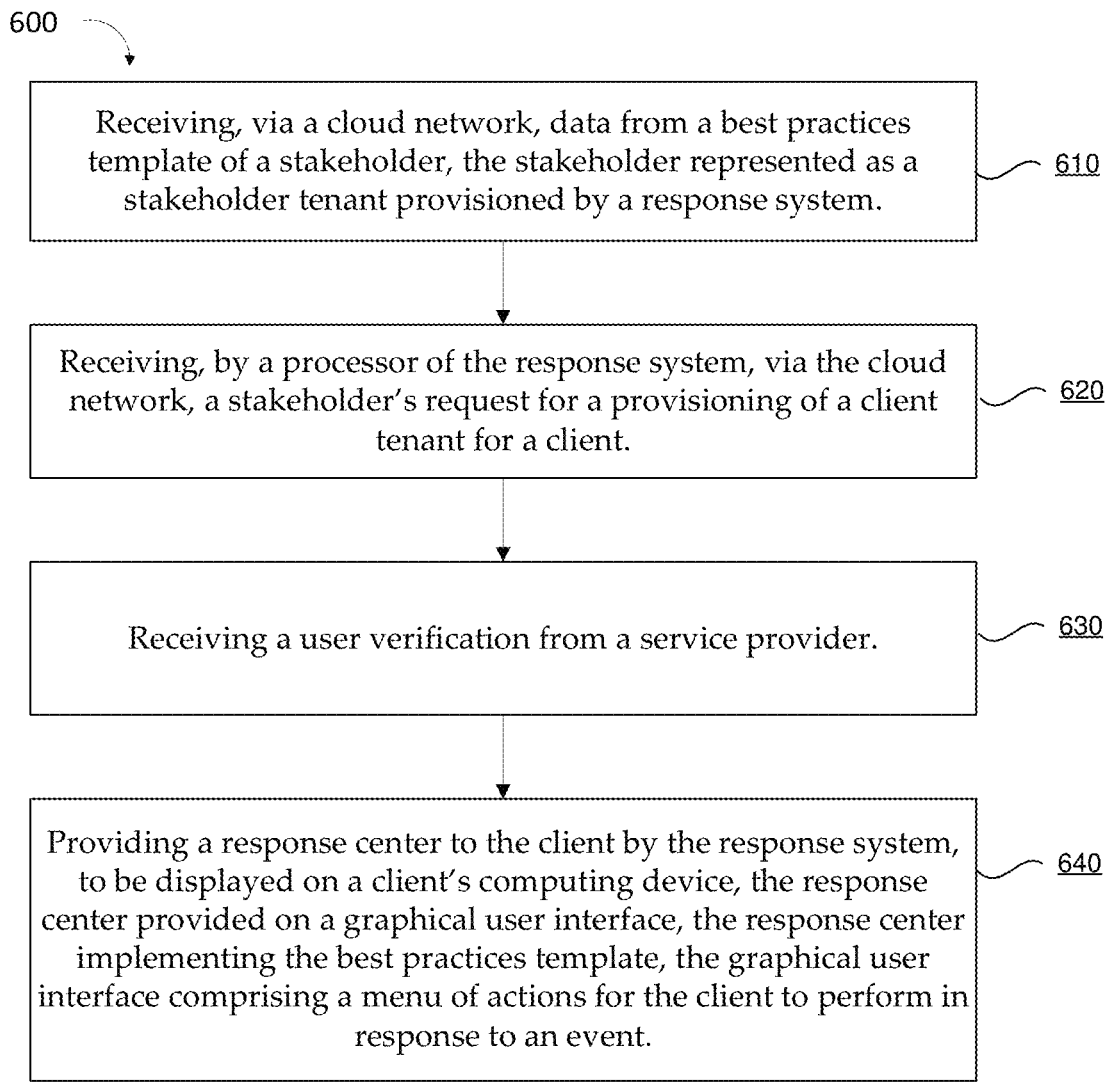
FIG. 6 illustrates a process flow diagram showing another method for providing response control and analytics.

FIG. 6 is a process flow diagram showing a method 600 for providing a response center for a client tenant. At operation 610, data from a best practices template of a stakeholder is received by a response system, via a cloud network. The stakeholder is represented as a stakeholder tenant provisioned by the response system. At operation 620, the processor of the response system receives, via the cloud network, a stakeholder's request for a provisioning of a client tenant for a client. At operation 630, a user verification of the client is received by the response system from a service provider via the cloud network. The user verification includes a security token that is received by a processor of the response system. At operation 640, a response center is provided to the client by the response system, to be displayed on a client's computing device. The response center is provided on a graphical user interface. The response center implements the best practices template. The graphical user interface comprises a menu of actions for the client to perform in response to an event.

Figure 7:
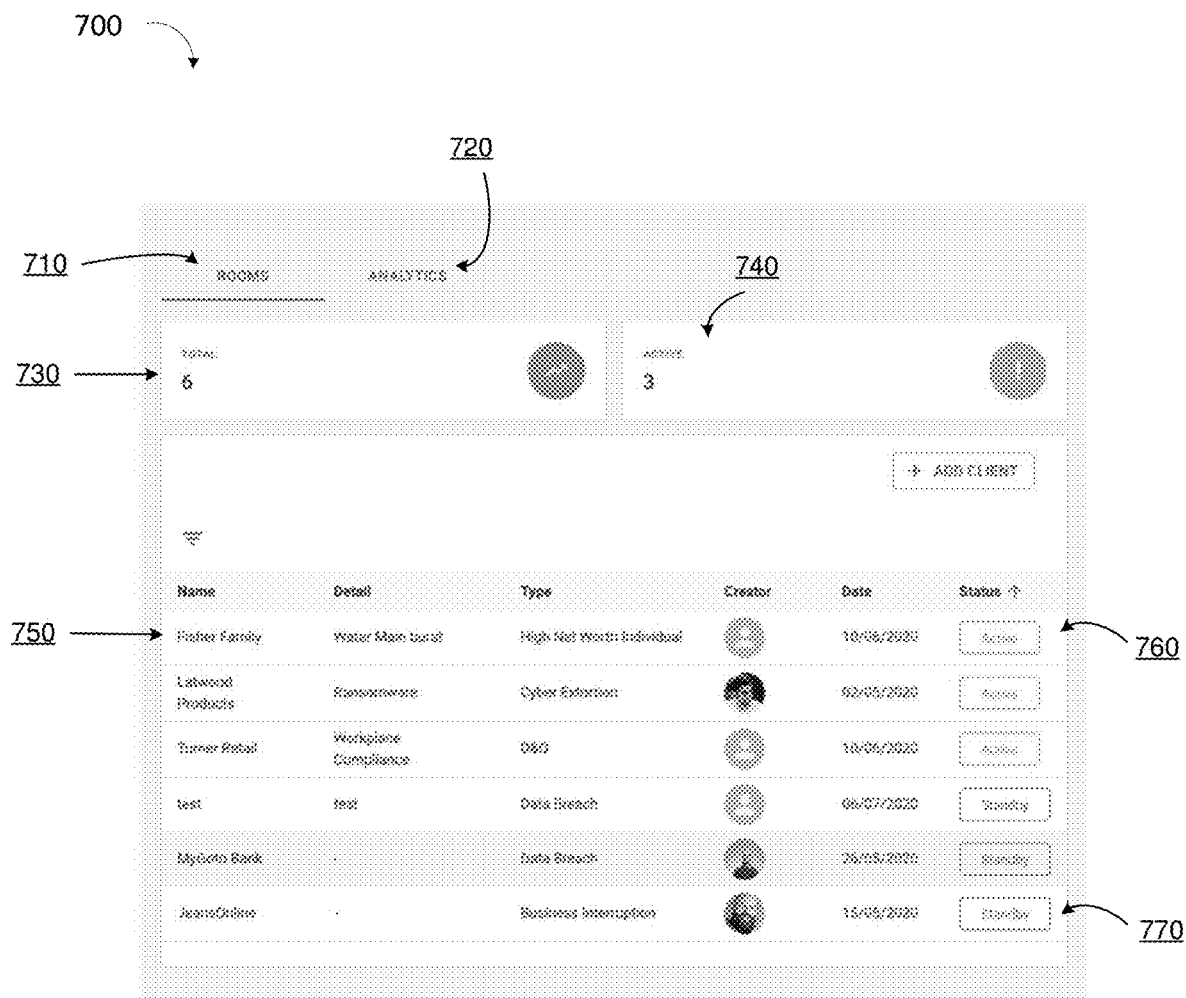
FIG. 7 illustrates an exemplary graphical user interface of an exemplary response center.
Figure 8:
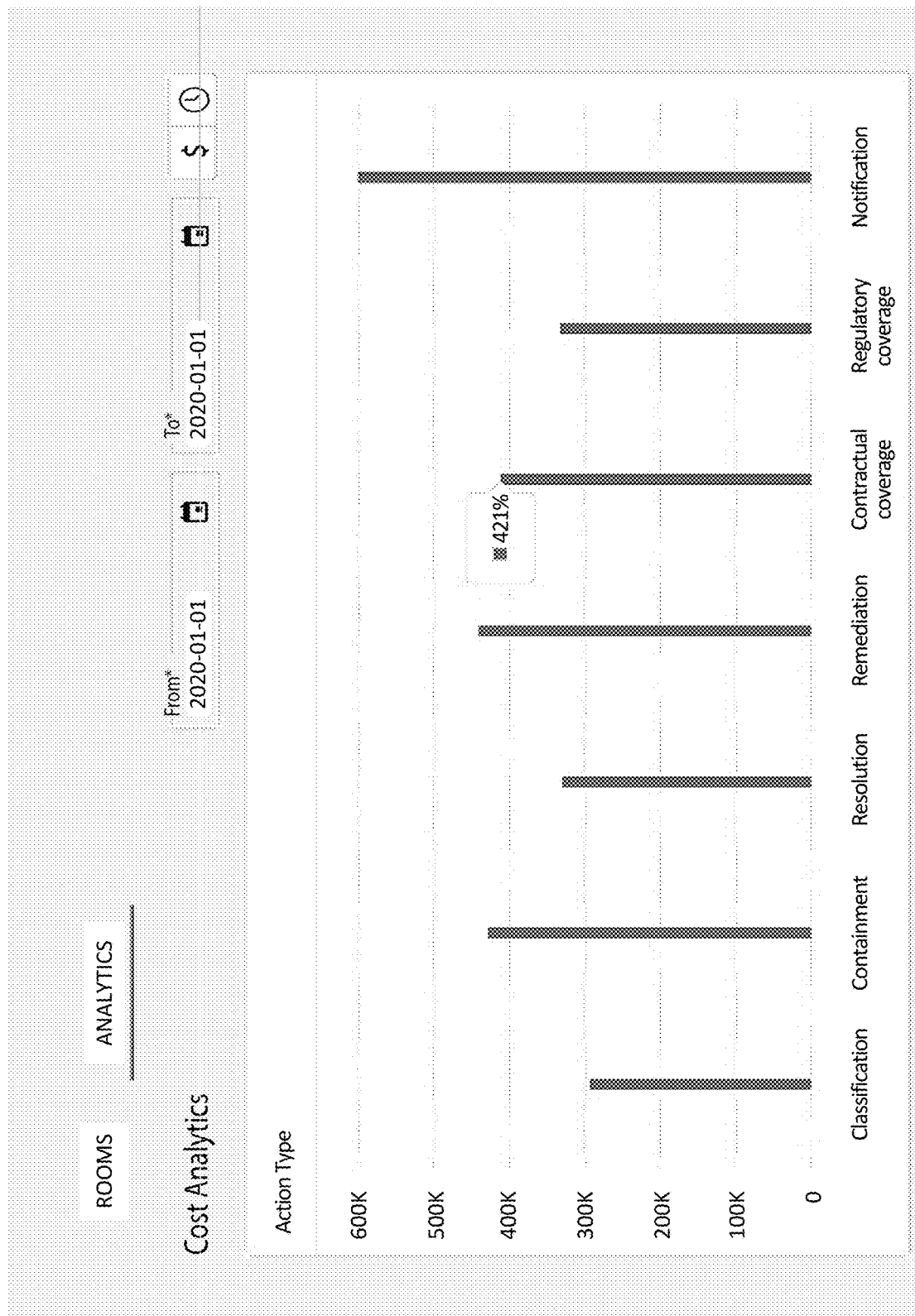
FIGS. 8-16, as well as FIGS. 17A, 17B and 17C, illustrate exemplary graphical user interfaces depicting various analytics that are provided with certain embodiments of the present disclosure.
Figure 9:
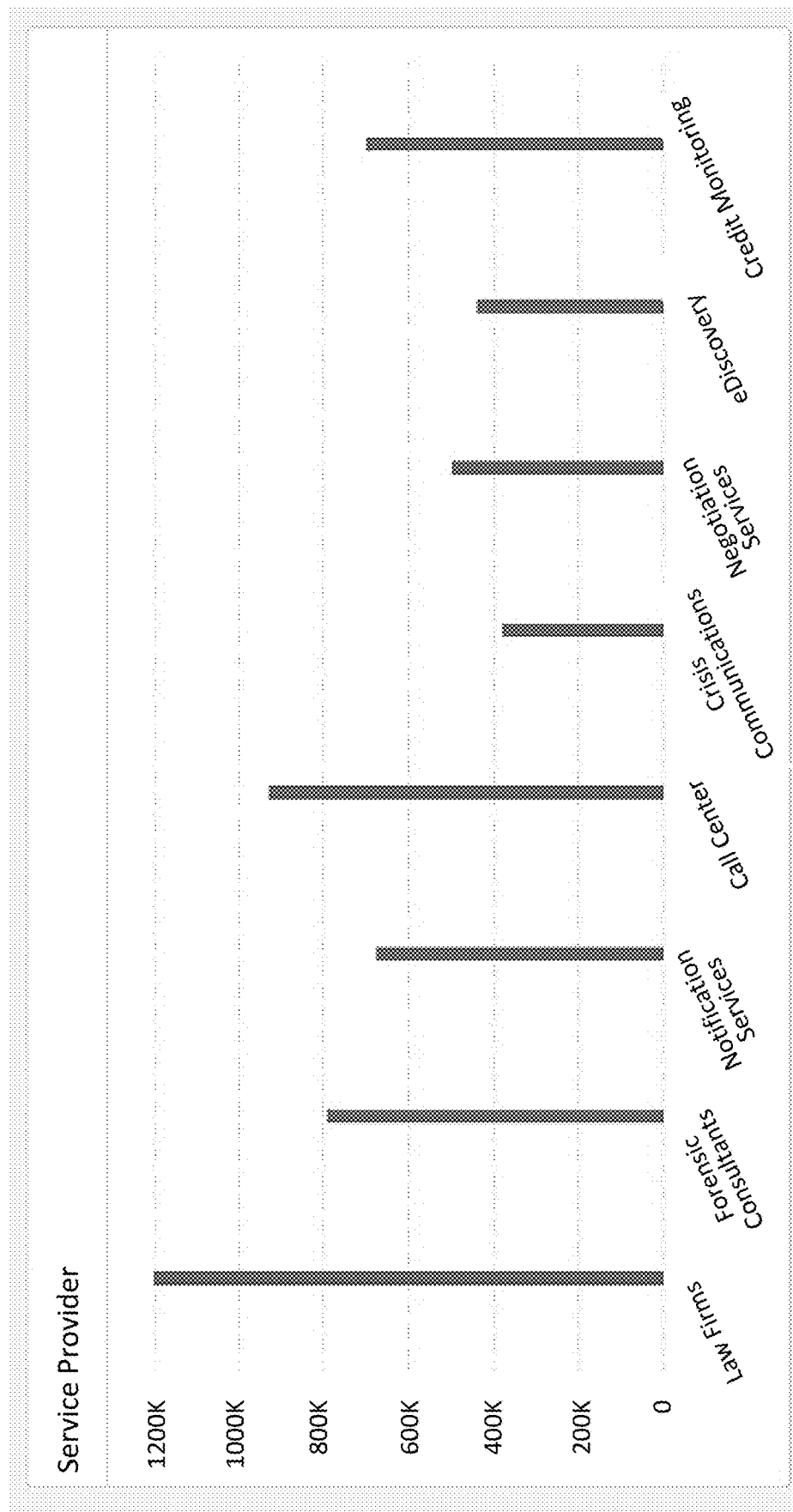
Figure 10:
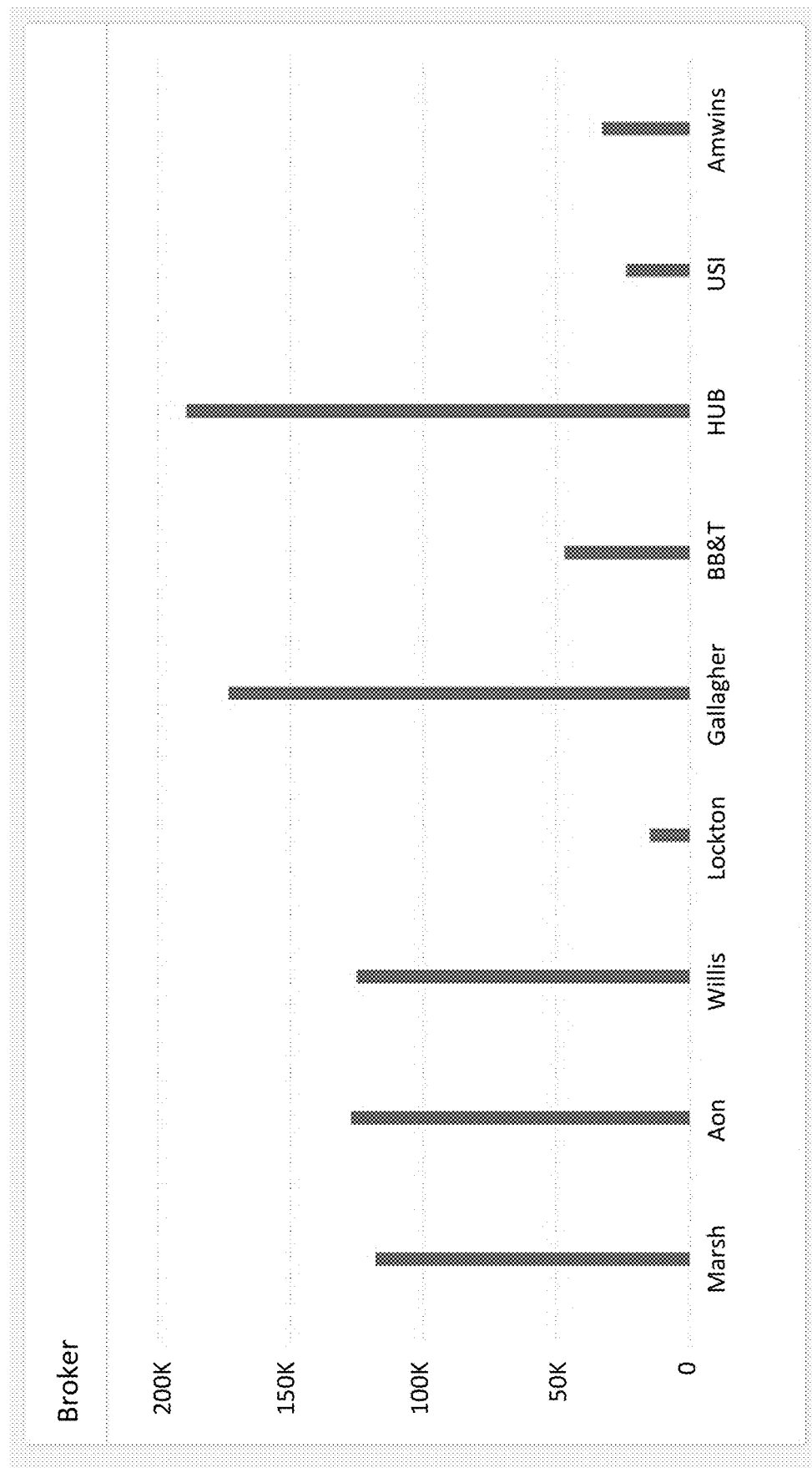
Figure 11:
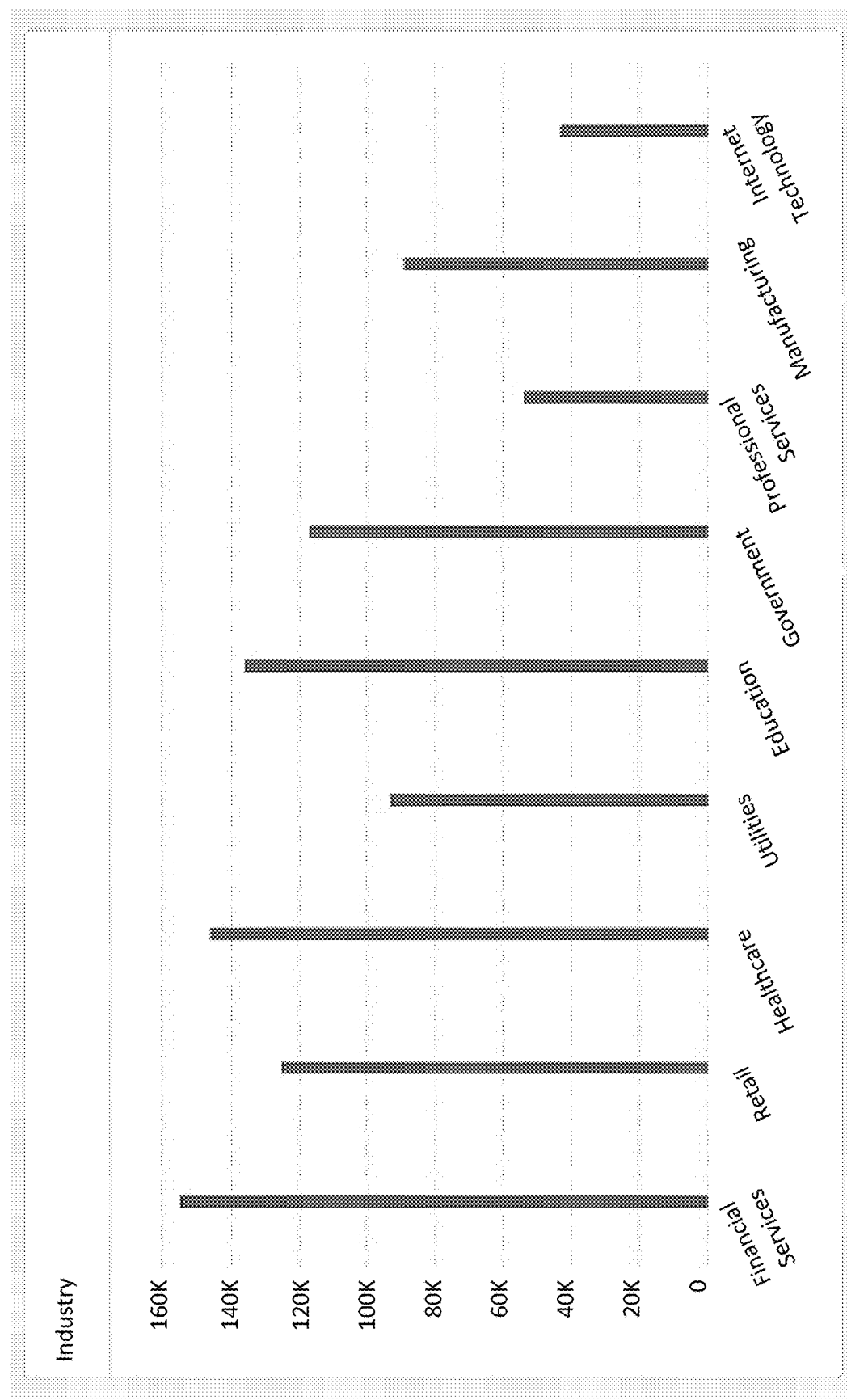
Figure 12:
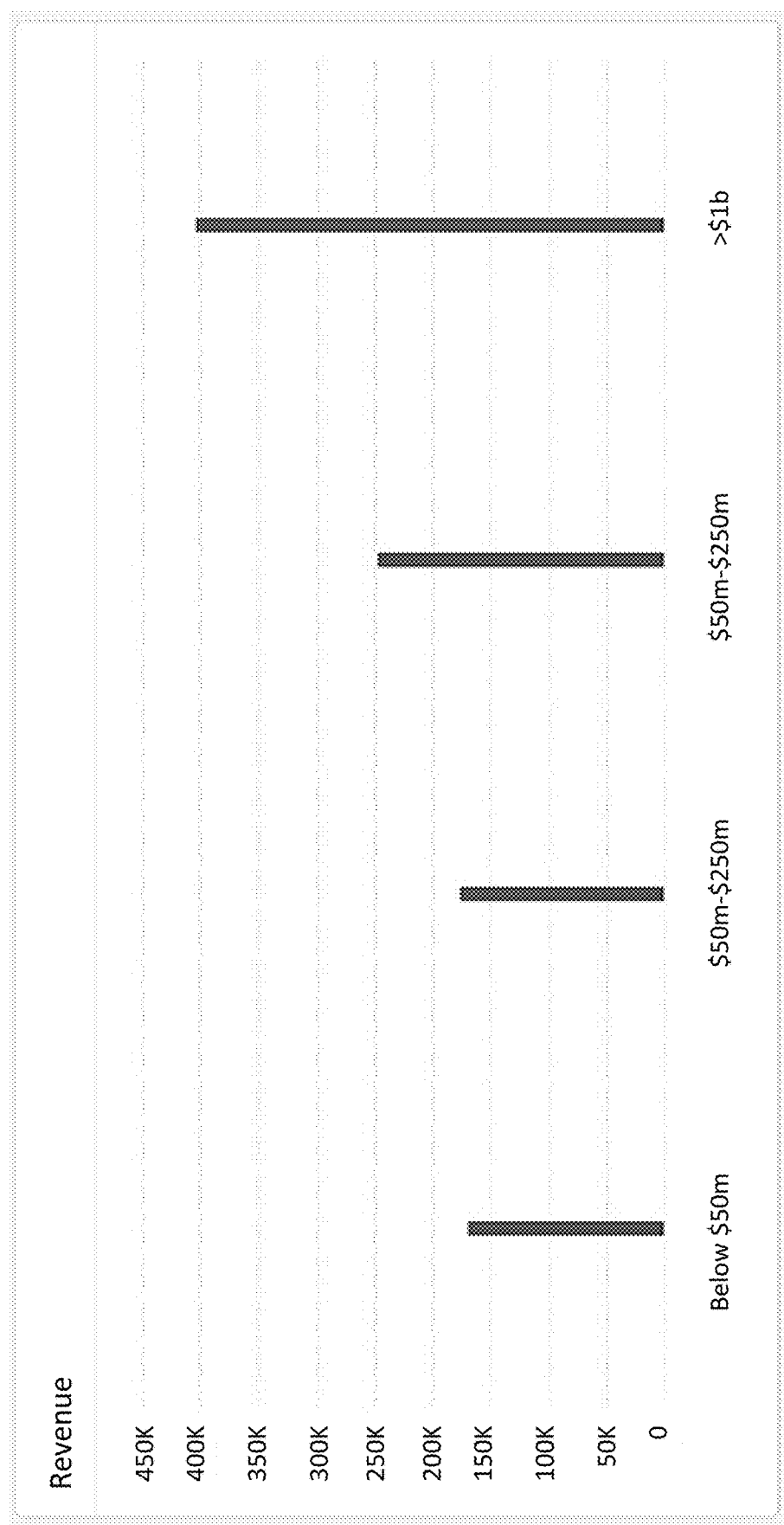
Figure 13:
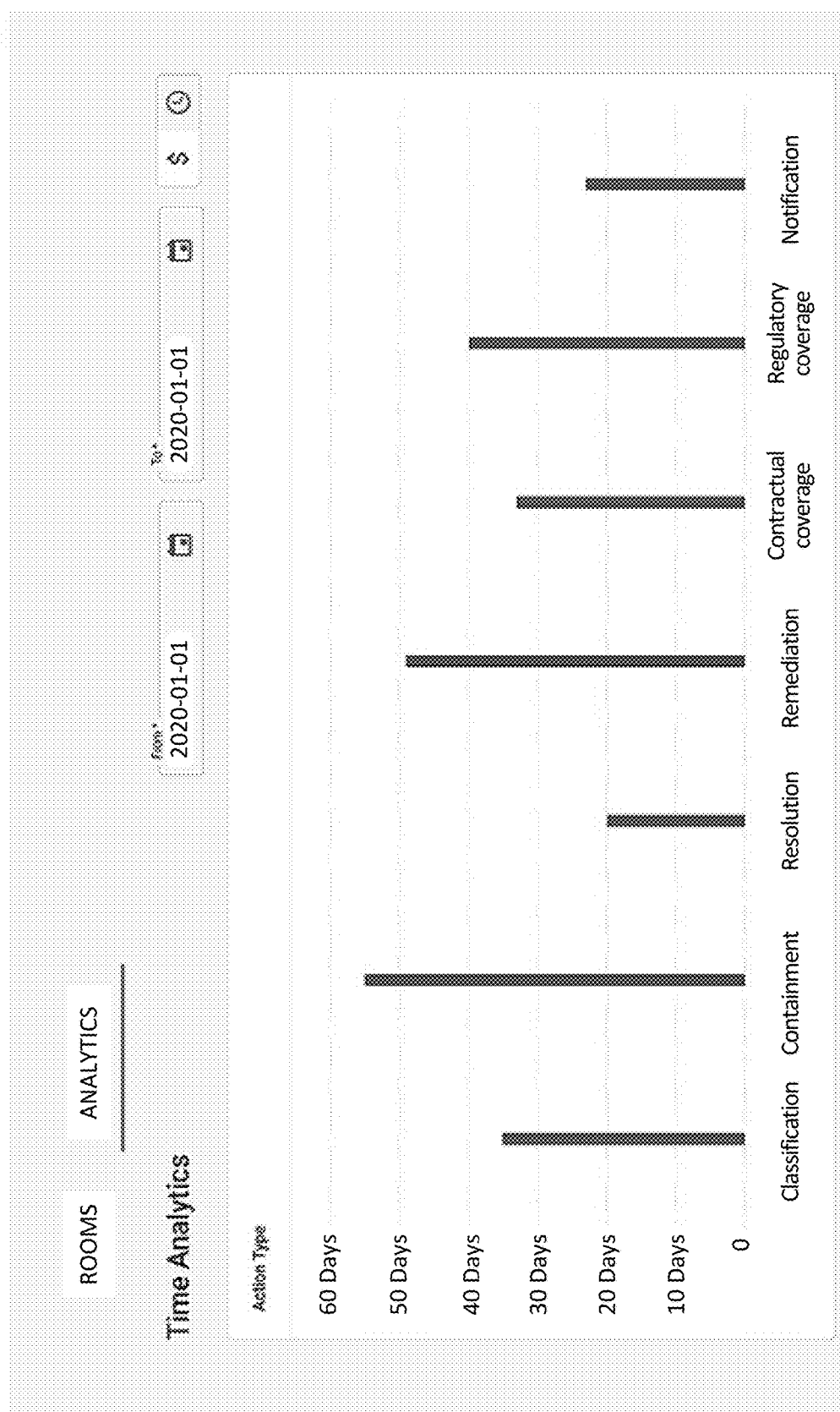
Figure 14:
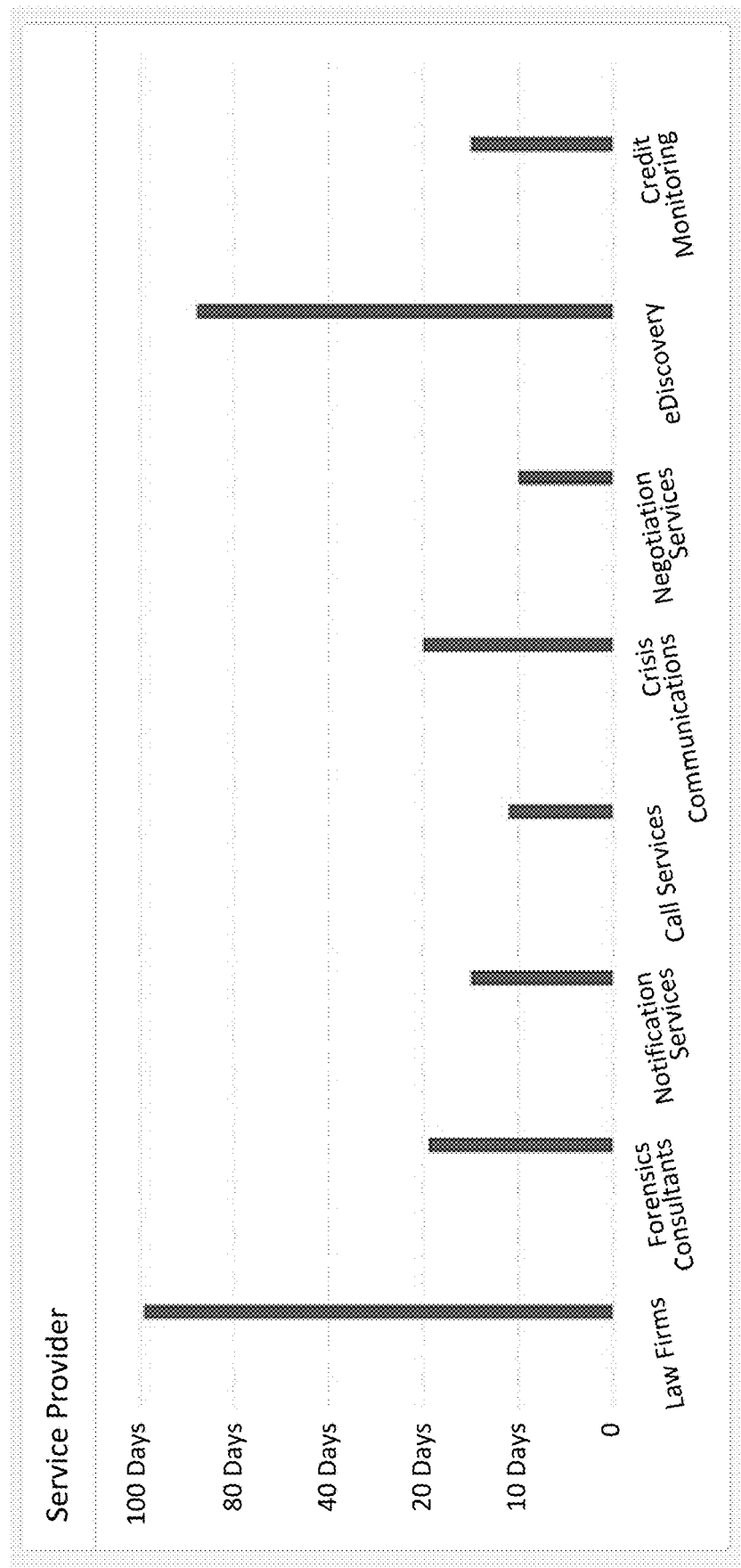
Figure 15:
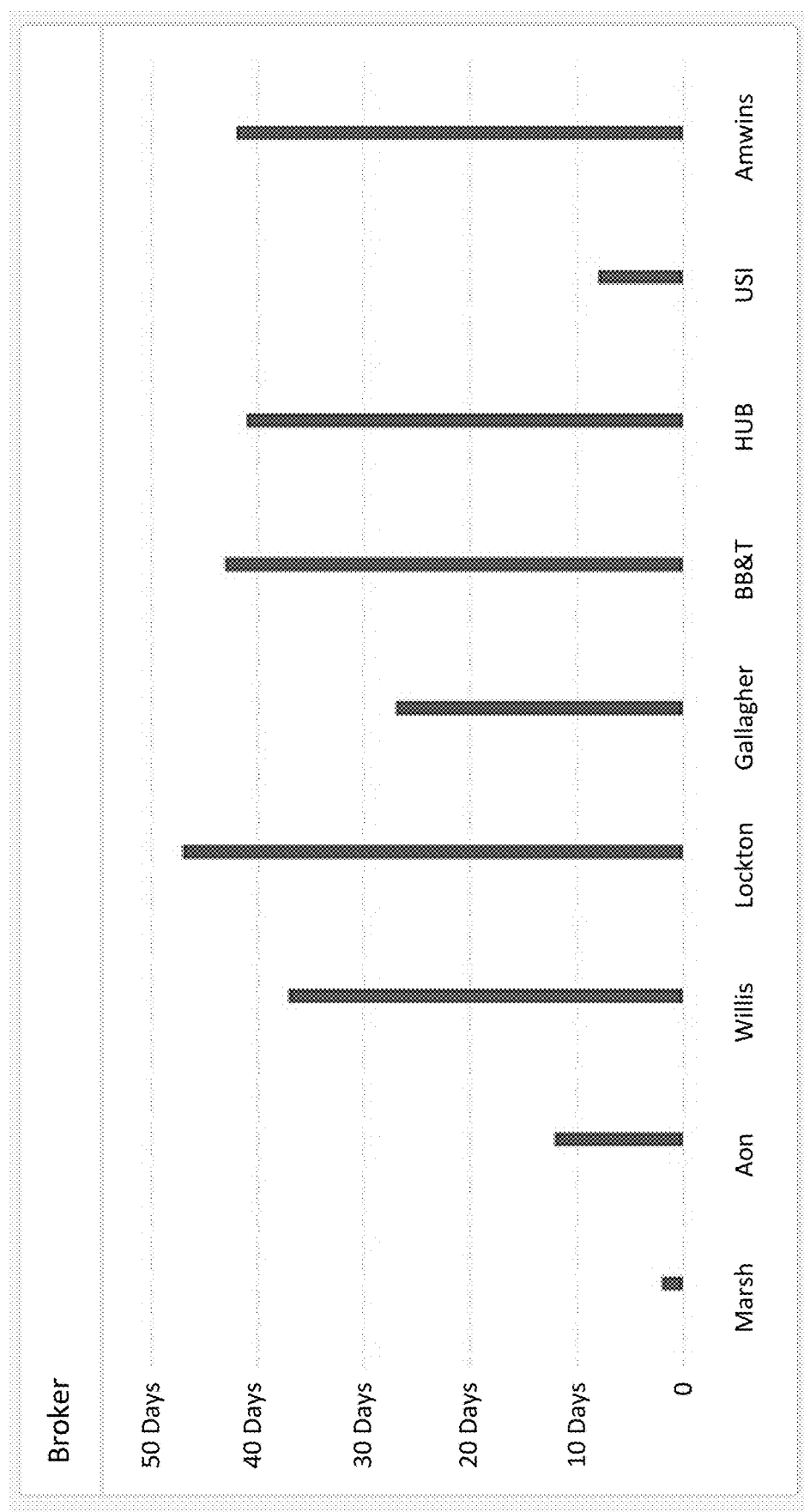
Figure 16:
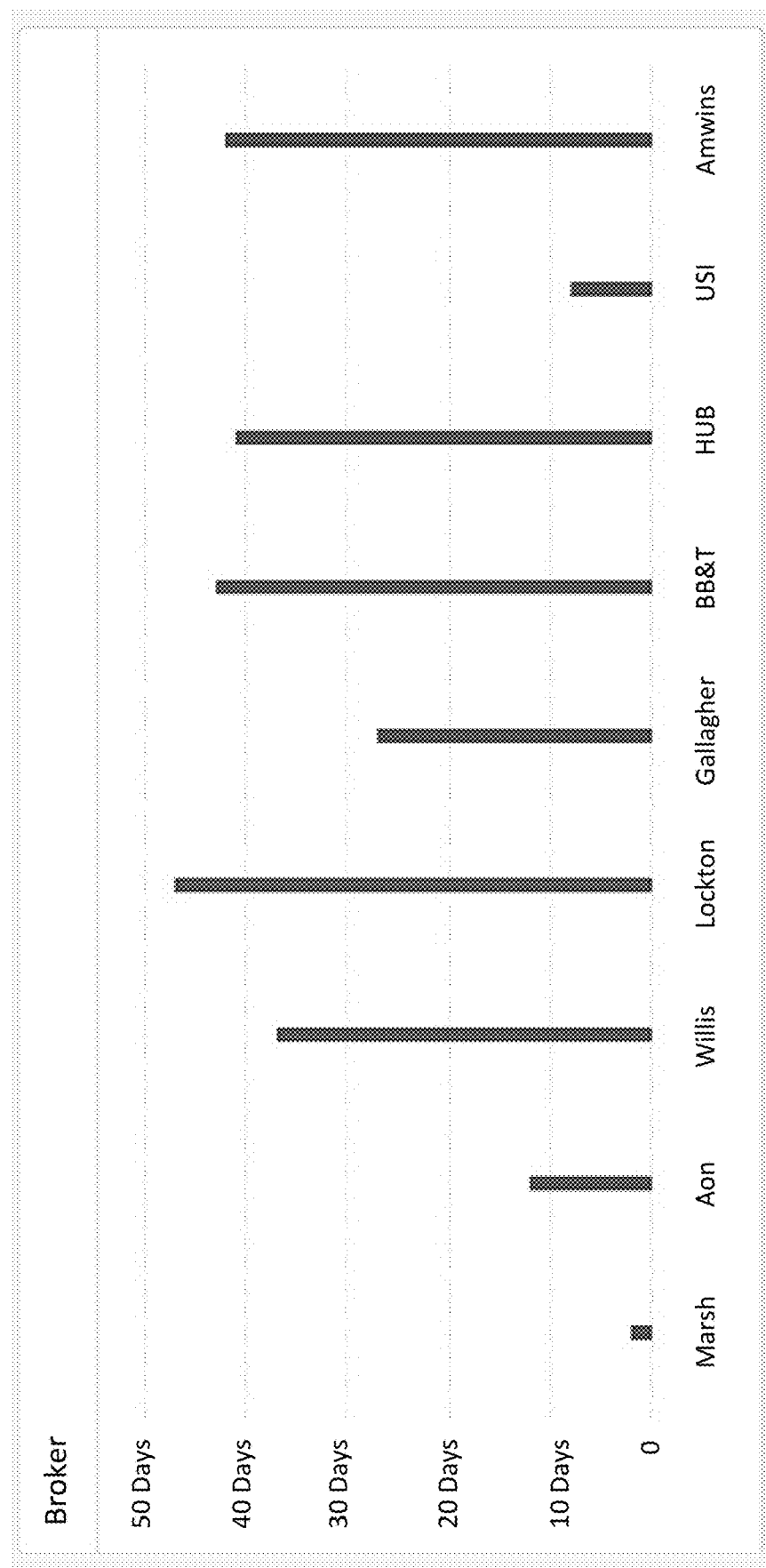

FIG. 7 is an exemplary graphical user interface of a dashboard 700 provided by the system to a stakeholder with a ROOM tab 710 and an ANALYTICS tab 720 which will be described later herein. If the stakeholder clicks on the ROOM tab 710, the dashboard 700 will appear that provides the stakeholder with a visual overview of the current status of the response centers of the stakeholder's clients. The stakeholder can add a client by clicking on the add client button of the GUI, in order to begin the process of establishing a response center for its client. In exemplary FIG. 7, the GUI depicts a total list 750 of six client response centers. The list 750 provides details of each of the client response centers, including the client name, further detail, and type of the event or breach, the name of the creator of the response center, and the date that the response center was created. The total count of six client response centers is provided in a field 730. Also, as shown in another field 740, three of the six total client response centers are active. In other words, five of the stakeholder's clients have indicated through their individual response centers that an event has occurred and that each of the client is responding to the event using the response plan as furnished by their individual response centers. The active status of those five clients is shown by the active status 760. The last client of the list 750 provided in FIG. 7 is shown as having a standby status 770, meaning that this client is currently not responding to an event and their response center is dormant/on standby.

Figure 17A:
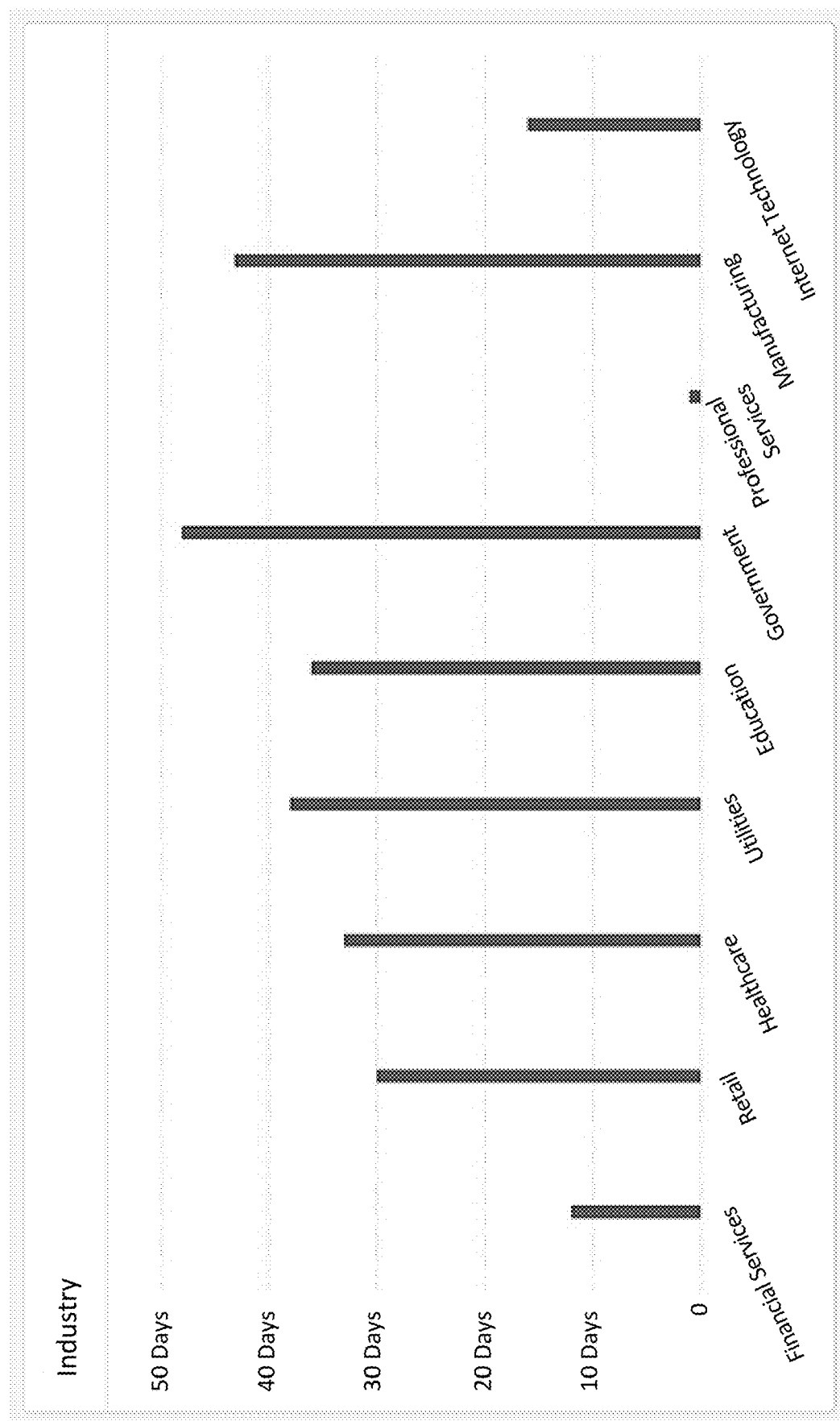
Figure 17B:
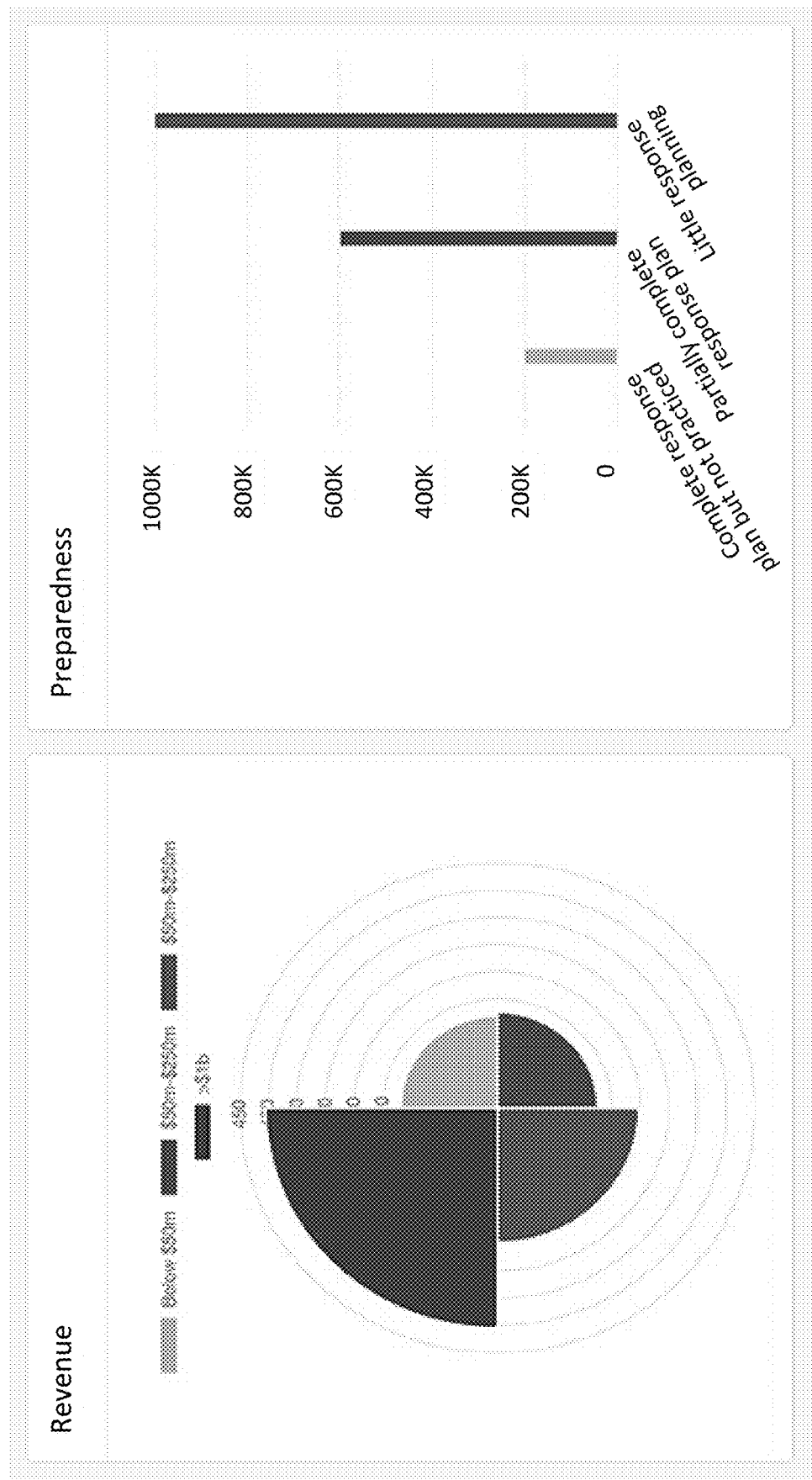
Figure 17C:

FIGS. 8-16, as well as FIGS. 17A, 17B, and 17C depict various exemplary graphical user interfaces of the types of analytics and metrics that the system captures and provides. In general, the system will gather data from the metrics emitted from the application, and classify that data under headings, such as the time to complete an action, the time to close a response center, and then a higher level of semantic data, such as the average number of data breach situations across the industry in Q2. In a non-limiting list, the types of metrics and analytics captured and generated by the analytics component 240 of the response system 200 include Cost or Time analytics, filtered by one or more of the following: action, service provider, broker, industry, revenue, and geography.

The analytics component can also provide analytics which compare time periods, such as Q1 of this year versus Q1 of last year, analytics in the form of trend lines, standard bench marking metrics, and the like. Actions, which are events that occur on entities, are emitted from the response center and as those events are emitted, they have metadata which contain information about the stakeholder and the like. The analytics component 240 of the response system 200 obtains and processes these events and metadata. If the stakeholder is opted into pooled analytics, these events can be placed as part of a pool. Otherwise the events can be associated with a single stakeholder. Based on these events the system can recommend/suggest changes to best practice templates (e.g., Target Time to Complete). Events can be generated by the system automatically such as during a state change or some can be entered manually. Events from the analytics system can also feedback into the client rooms—e.g. $70^{th}$ percentile of time to complete an action and the like. Furthermore, the system can learn common third party suppliers involved in rooms and issue suggestions. The system can leverage machine learning, such as anomaly detection to flag outliers in the room set (cost of action, incomplete action, number of people, groups involved etc.). The system can leverage machine learning (i.e. anomaly detection) to flag response centers that are potentially not prepared for a breach or an event.

Figure 23:
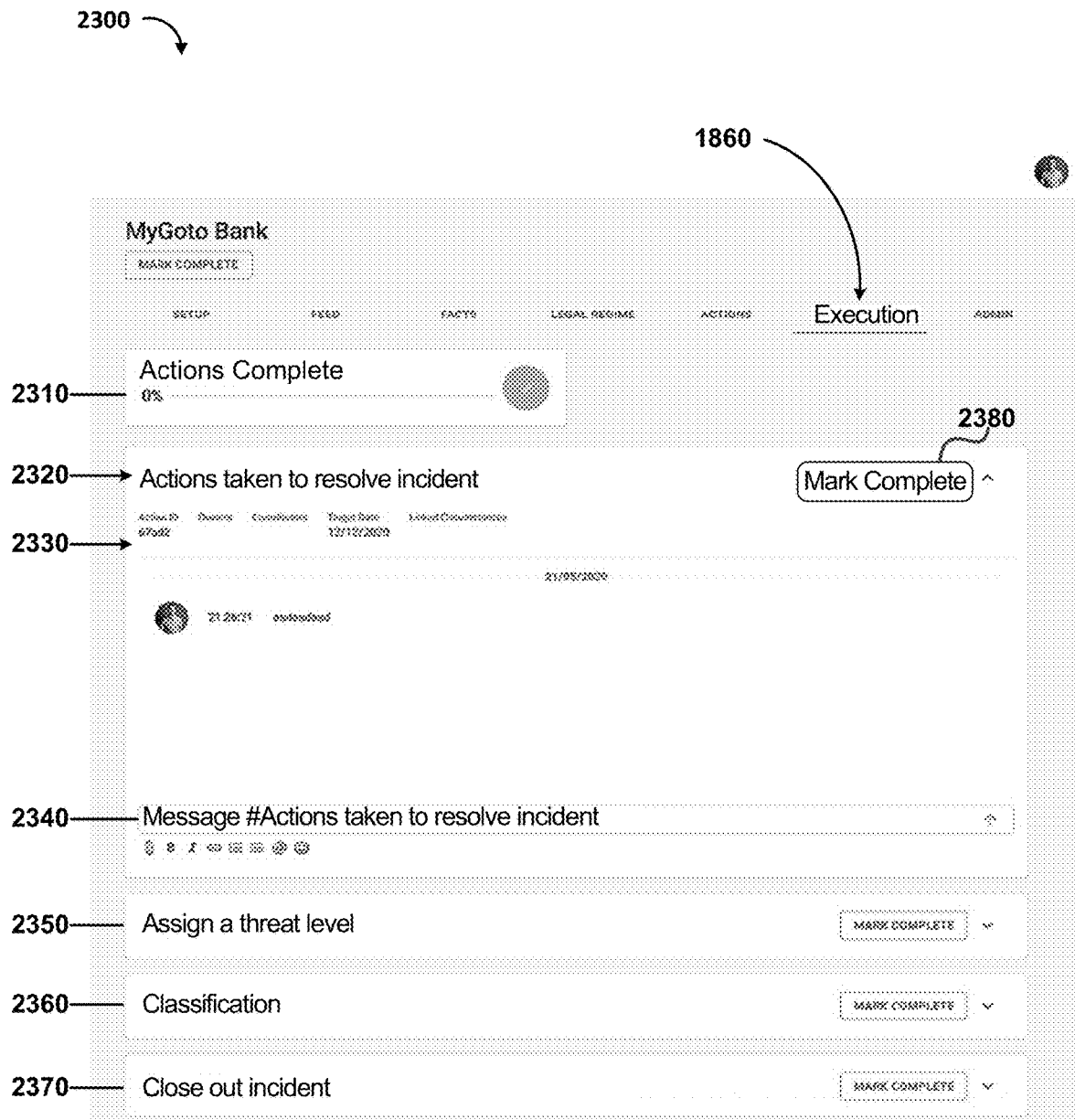
FIG. 23 illustrates an exemplary graphical user interface of an executions tab of a response center, in accordance with certain embodiments of the present disclosure.

If a client clicks on a graphical user interface of their response center, all the activity and data connection are being logged. Therefore, the system can answer many questions based on analytics. For instance, the system can answer such questions as: How long was it before a breach or event was identified, the call team was contacted and the client's response center was activated by the client? What was the average time between the responses from the team or updates from the team on a classification? This information can be shown in the execution tab as depicted in FIG. 23. Analytics may be customizable based on what the stakeholder wishes to view.

Also, as a client is responding to an event, the client may wish to view analytics provided by the analytics component that may be helpful to the client. For instance, predictive analytics may be furnished to the client which provides feedback to the user in real time. Also, aggregated anonymized analytics may be provided to the client. For instance, the analytics component may inform the client that across European retailers in the client's industry, it took approximately three weeks to complete a given stage of the response plan. Some of the analytics may be fine-grained, while other analytics are inline. Inline analytics occurs when the analytic is delivered right next to where the operation is performed. For instance, if there is a discussion amongst people on how to manage task X, imagine there is a slider or graph that shows how long task X is taking, but also how long it has taken everyone else. Thus, the analytic of how well a client is doing compared to their peers is delivered inline—right next to where the operation is actually taking place. The alternative to inline analytics is offline analytics where a task is performed in one place and all the analytics are collected in a separate place. Thus, a client must view a separate analytics page or application to obtain the analytics. Analytics may include two levels of data, namely, system data and anonymized user data.

In a non-limiting example of a use case, in accordance with certain embodiments of the present disclosure, the response system can provide valuable feedback, metrics and analytics to one or both of the client and the stakeholder. The system can analyze a current state of a client's response center and issue a preparedness score. This preparedness score is a numerical representation of how prepared the client is to respond to an event or a given event type. The response system can analyze the amount of time it took for the client to complete one or more actions in response to an event. Then the system can show or provide data of where the client falls in relation to the stakeholder's other clients or the client's peers within the system or SDA based on regulation. For instance, the system can determine how much time it took for the client to notify a regulator that an event occurred. The system can also determine how much time it took for the client to notify the individuals affected by the event or the public at large.

Then, based on the event type, the system can prioritize two or more actions that are designed to mitigate the risk in response to the event. For instance, if the event type is a data breach, the system is likely to prioritize the changing of passwords within a given number of hours and indicate to the client through its response center that the action to change passwords is a top priority for the client to act upon as part of the client's response to the data breach event.

In further embodiments, based on historical data for actions that are generated by the system and/or by a user, the response system can heuristically learn or determine what are the typical actions that performed during a response to an event, such a breach response, and based on such information, the system can suggest those actions and/or suggest amendments to the best practices templates of the stakeholder and/or the client.

In other embodiments, based on learning of real world events that occur or based on analysis of data reports, news items, external third party resources, and the like, the response system can issue training events with similar characteristics, thereby allowing clients to practice how they respond to an event. The client's actions and timings of their response to an event can then be compared with the real event data to see if the client reacted well, or whether the client's preparedness for a given event needs improvement.

In yet further embodiments, if a certain type of event occurs, the response system can provide valuable information to a client, such as providing contact information of providers or third parties entities that are recommended by the system and/or the stakeholder's best practices template. Thus, for instance, if flooding happens to a banking company in a branch office, the response system may provide the recommended list of flood specialists in the area that can quickly assist in mitigating the flood damage. Also, the response system through a wizard can analyze the profile of a company and show or provide real world events that have happened to related companies. In some embodiments, the response system can provide this information through the news feed of a client's response center, which is described later herein.

Figure 18:
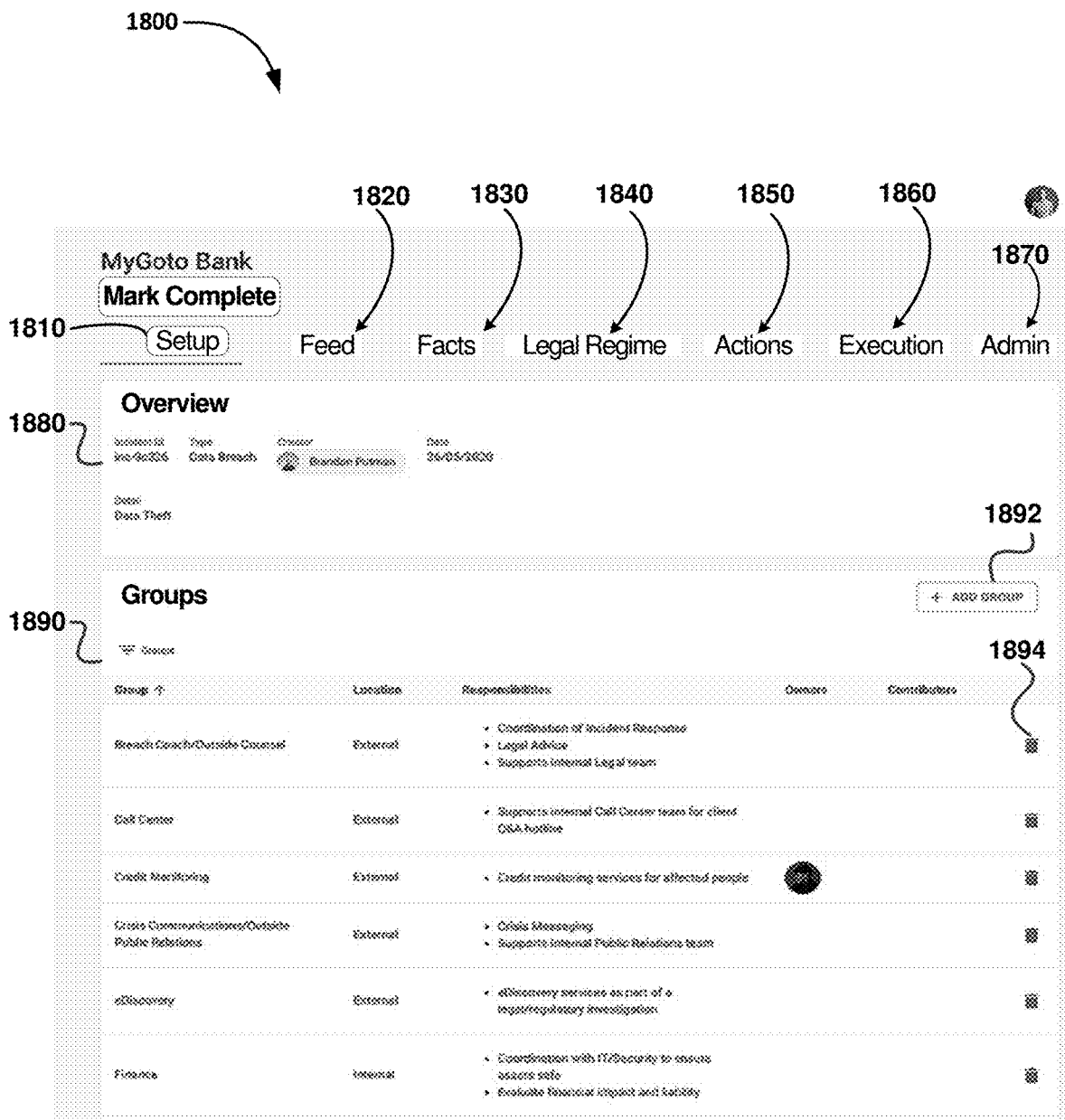
FIG. 18 illustrates an exemplary graphical user interface for a setup of a response center, in accordance with certain embodiments of the present disclosure.

FIG. 18 illustrates an exemplary graphical user interface 1800 that is displayed on a client device when the client selects the SETUP tab 1810. Other tabs available for client selection include FEED tab 1820, FACTS tab 1830, LEGAL REGIME tab 1840, ACTIONS tab 1850, EXECUTION tab 1860, and ADMIN tab 1870. These other tabs will be described in further detail in conjunction with FIGS. 19-24, later herein.

When the user selects the SETUP tab 1810, two GUI panels may appear which include an Overview panel 1880 and a Groups panel 1890. The overview panel 1880 provides an overview or quick summary regarding the event at hand. The event as shown in exemplary FIG. 18 is a data breach that occurred on May 26, 2020 as reported by creator Brandon Putnam. The detail regarding this data breach shows that this event was a data theft.

The Groups panel 1890 provides an overview of the various groups associated with the client business or organization that was affected by the event. The groups may be external to the client business (such as a call center or a group of lawyers) or internal (department employees in Finance or eDiscovery and the like). The Groups panel 1890 provides the location, designated responsibilities, the owners and the contributors of each group. A team member of the client business can add or remove a group by clicking the appropriate buttons 1892 and 1894, respectively.

Figure 19:
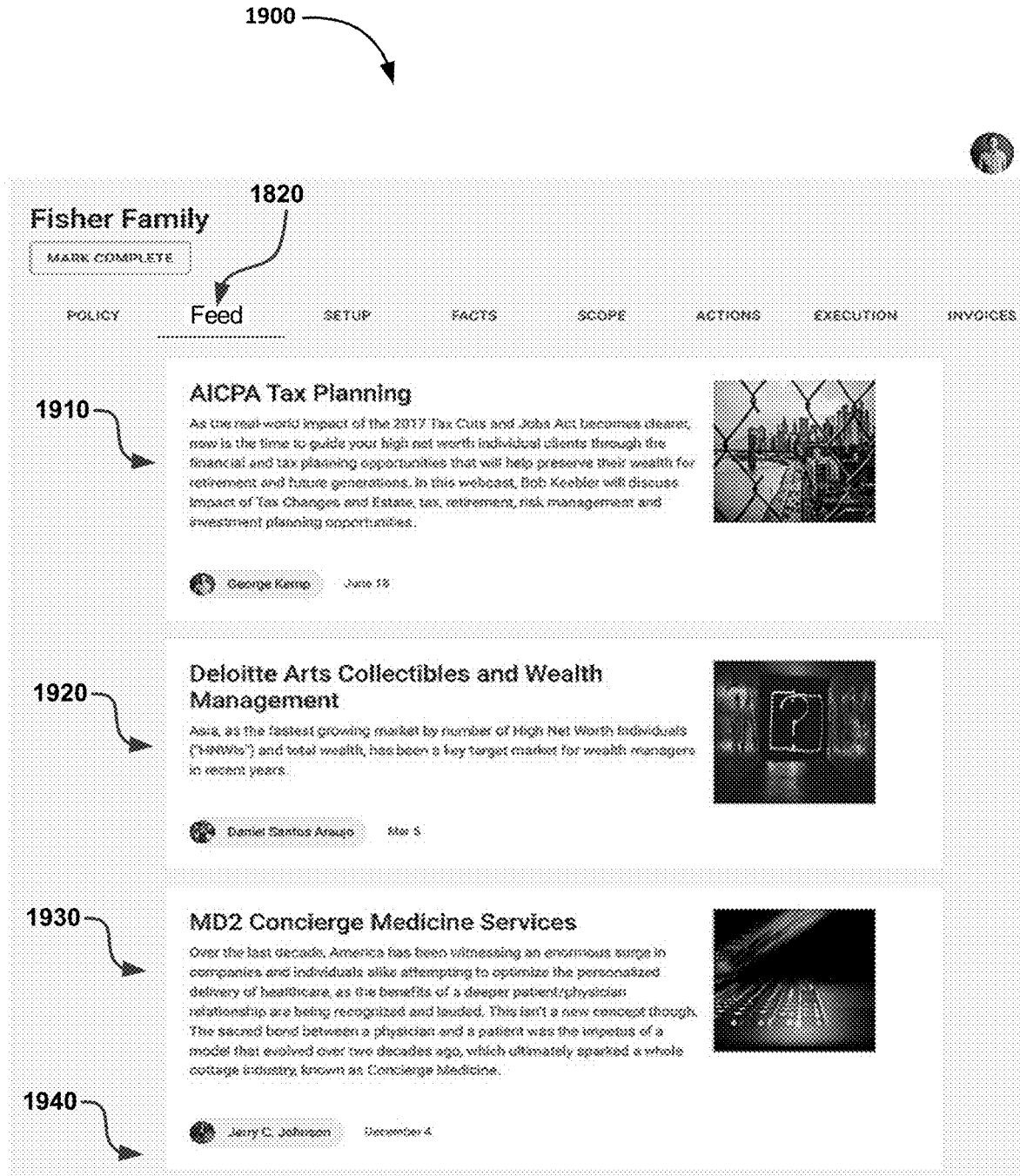
FIG. 19 illustrates an exemplary graphical user interface of a feed of a response center, in accordance with certain embodiments of the present disclosure.

FIG. 19 illustrates an exemplary graphical user interface (GUI) 1900 that is displayed on a client device when the client selects the FEED tab 1820. One or more news items, articles, press releases, blogs, vlogs, hyperlinks, emails, reports, studies, journal articles, documentation, and/or descriptions of events or breaches that are relevant to the client will be presented to the client in the GUI 1900 such that the client can scroll through and read the items that the client selects. Although FIG. 19 shows a GUI of a news feed having four items 1910, 1920, 1930 and 1940, one skilled in the art will recognize that FIG. 19 is for illustrative purposes only and that the news feed can comprise of any number of items.

Figure 20:
FIG. 20 illustrates an exemplary graphical user interface for a facts tab in a response center, in accordance with certain embodiments of the present disclosure.

FIG. 20 illustrates an exemplary graphical user interface 2000 that is displayed on a client device when the client selects the FACTS tab 1830. A list of attributes 2020 is presented to the client. Each attribute provided in the list 2020 may be suggested by the system, based in part on one or both of the stakeholder's best practices template and the client's preferences, as an attribute that the client's team may wish to investigate and provide detail. The detail may be input by the client's team members in field 2030. The client can add an attribute by selecting ADD ATTRIBUTE button 2040, if an attribute is missing and the client wishes to add it as part of its fact investigation. The client may also wish to delete a suggested attribute and can do so by selecting the button 2050 next to the appropriate attribute.

Figure 21:
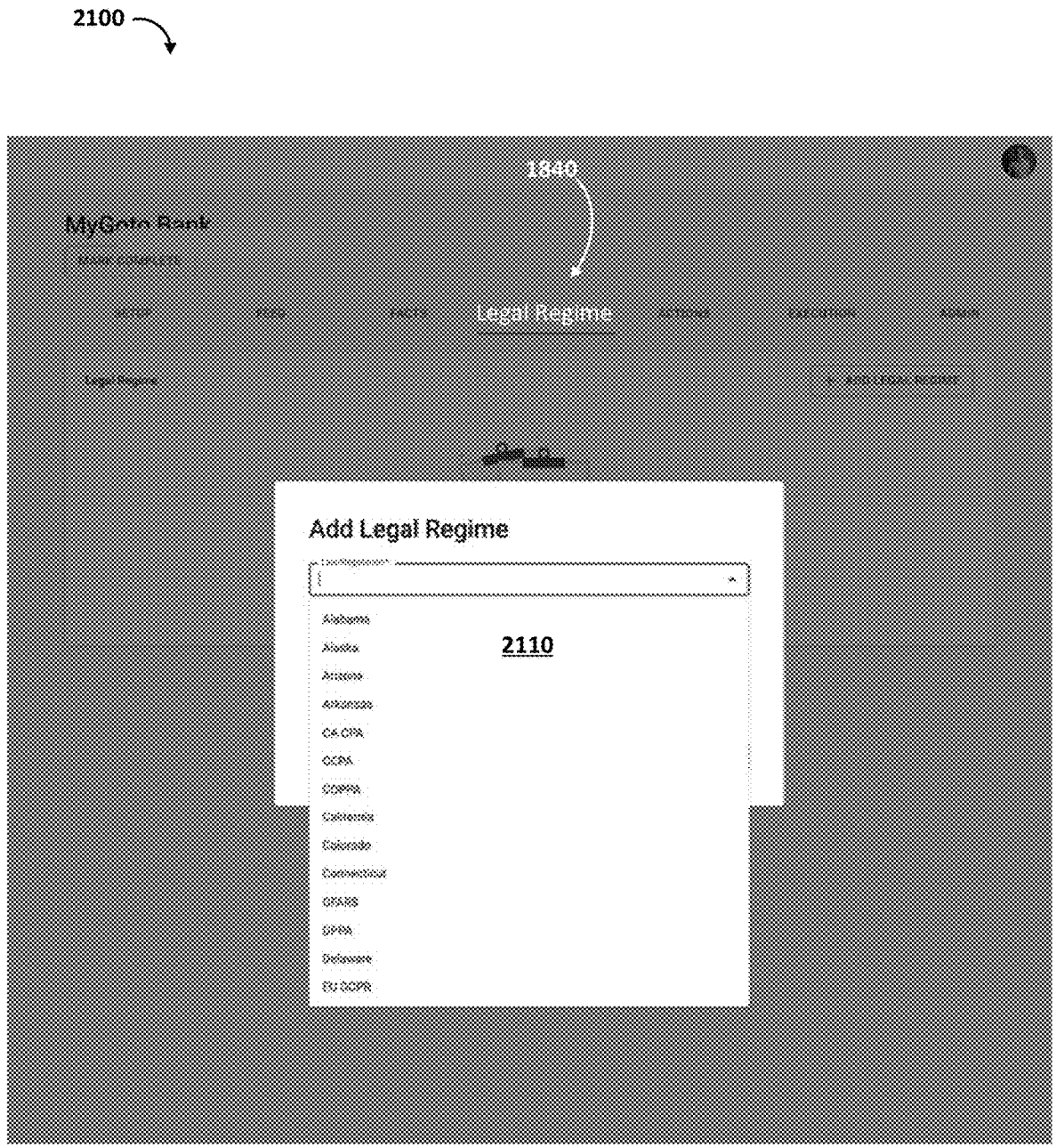
FIG. 21 illustrates an exemplary graphical user interface for adding a legal regime in a response center, in accordance with certain embodiments of the present disclosure.

FIG. 21 illustrates an exemplary graphical user interface 2100 that is displayed on a client device when the client selects the LEGAL REGIME tab 1840. As previously described, a legal regime can help to identify if certain laws are involved (such as the laws of the countries like Germany or the US, or particular laws, such as the European GDPR privacy laws). The client may select to add a legal regime by way of a drop down menu 2110.

Figure 22:
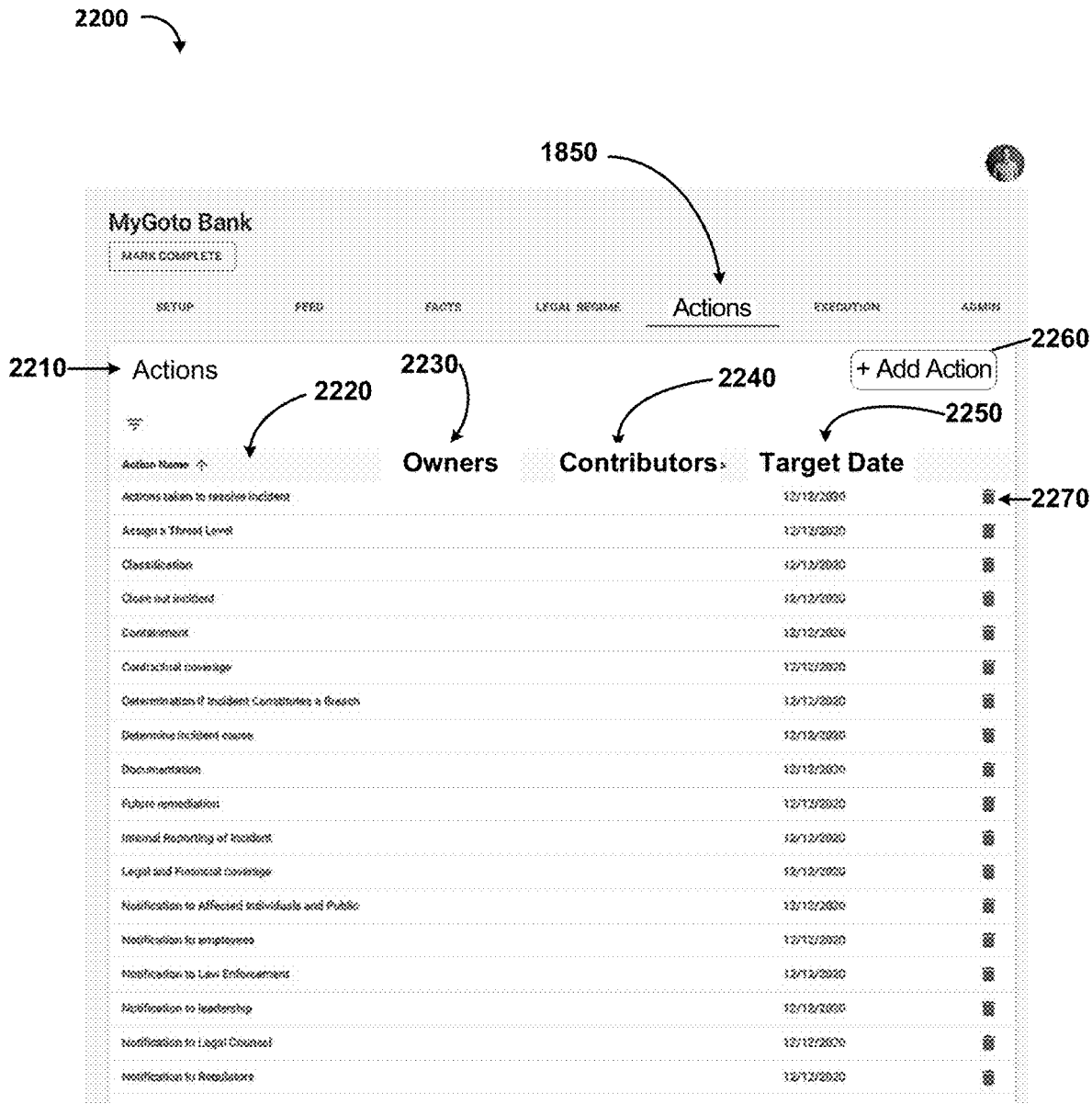
FIG. 22 illustrates an exemplary graphical user interface of an actions tab of a response center, in accordance with certain embodiments of the present disclosure.

FIG. 22 illustrates an exemplary graphical user interface 2200 that is displayed on a client device when the client selects the ACTIONS tab 1850. A list of actions 2210 is presented to the client. Each action provided in the list 2220 may be suggested by the system, based in part on one or both of the stakeholder's best practices template and the client's preferences, as an action that the client's team may wish to perform in order to address the event. Names of owners 2230 and contributors 2240 designated to work on a given action may be listed, as well as a target date 2250 of completing a given. The client can add an action by selecting ADD ACTION button 2260 or may delete an action by selecting button 2270 next to the corresponding action. This allows for a client to track each action as it is being completed and manage who has access to view or edit information. For instance, the client may grant permission for its outside lawyer to see all the data, but may also grant limited access to an external public relations firm. Each action may become a separate thread in the execution section and can be marked complete or not. The participants of each action can have a conversation, upload documents, approve, vote, and the like. All the activities of the participants pertaining to an action is captured and logged by the response system. Also, within each action, the client can view analytics that compares the client to their peers. For instance, the analytics may be displayed in a chart which shows the average number of days the client's peers took to complete a particular action, as compared to the number of days that the client took to complete the same or similar action.

FIG. 23 illustrates an exemplary graphical user interface 2300 that is displayed on a client device when the client selects the EXECUTION tab 1860.

Figure 24:
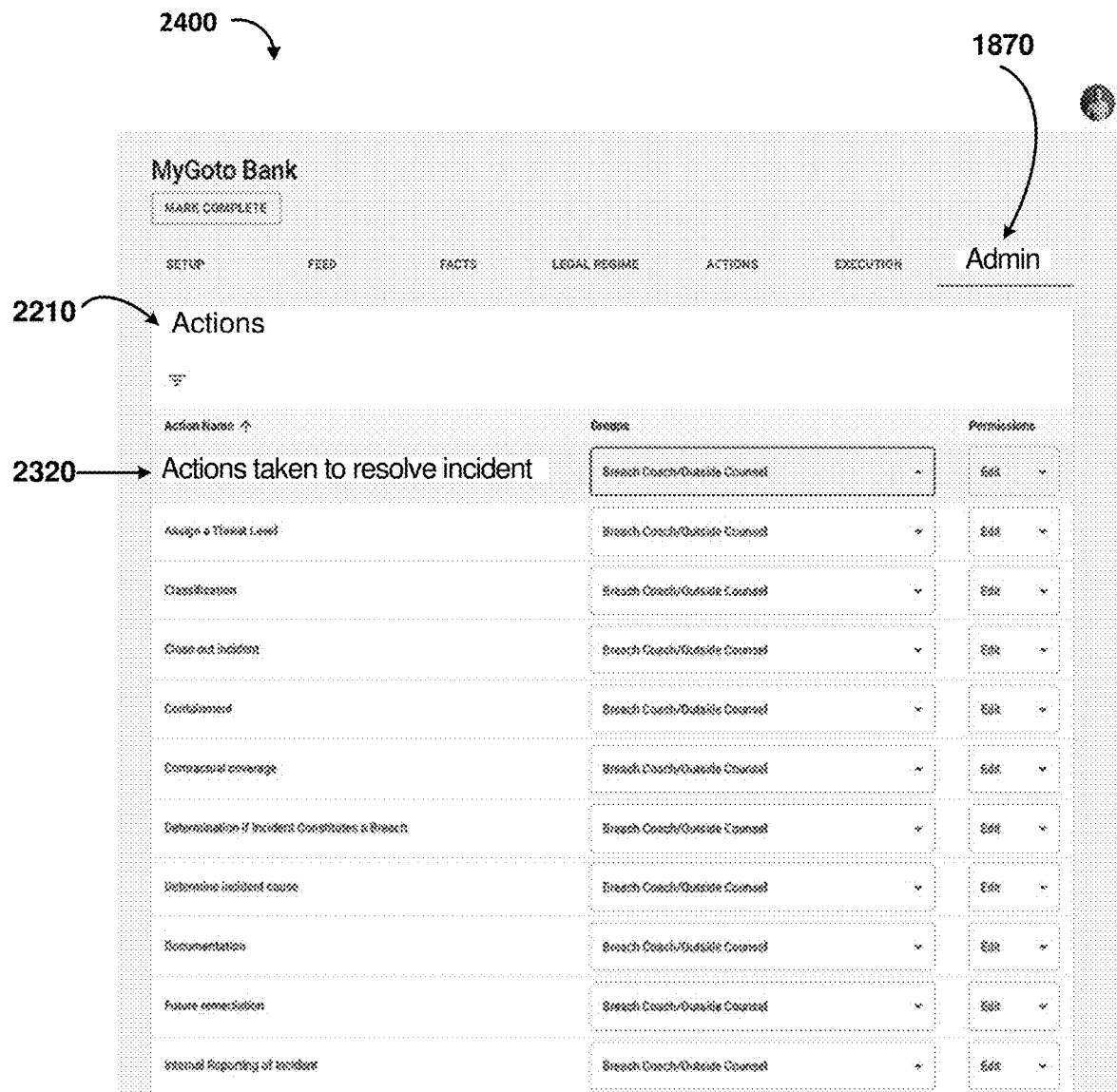
FIG. 24 illustrates an exemplary graphical user interface of an administrator tab of a response center, in accordance with certain embodiments of the present disclosure.

FIG. 24 illustrates an exemplary graphical user interface 2400 that is displayed on a client device when the client selects the ADMIN tab 1870. Based on the list of actions 2210 (FIG. 22) that were to be completed in order to respond to an event, the system provides a completion indicator 2310 regarding the current progress made towards the completion of actions. In the exemplary FIG. 23, the completion indicator 2310 shows that none of the action have been completed and in fact, no progress has been made towards completion of the actions, since the completion indicator 2310 shows a progress of 0%.

Referring to FIG. 23, the client is provided with an Actions panel 2320 which is a list of the actions to be taken in order to resolve or respond to an event or a threat. Details 2330 of each action are provided, which include an action identifier (which may be a unique identifier associated with a given action), names of creators and contributors associated with or tasked with the action, a target date, linked circumstances, and the like. The user can input information such as inputting messages 2340 regarding actions taken to resolve the event, assign a threat level 2350 associated to the event or incident, classify 2360 the event or incident, and the user can also close out 2370 the event or incident. The user can also mark actions as completed by selecting the MARK COMPLETE button 2380 of the GUI.

Figure 25:
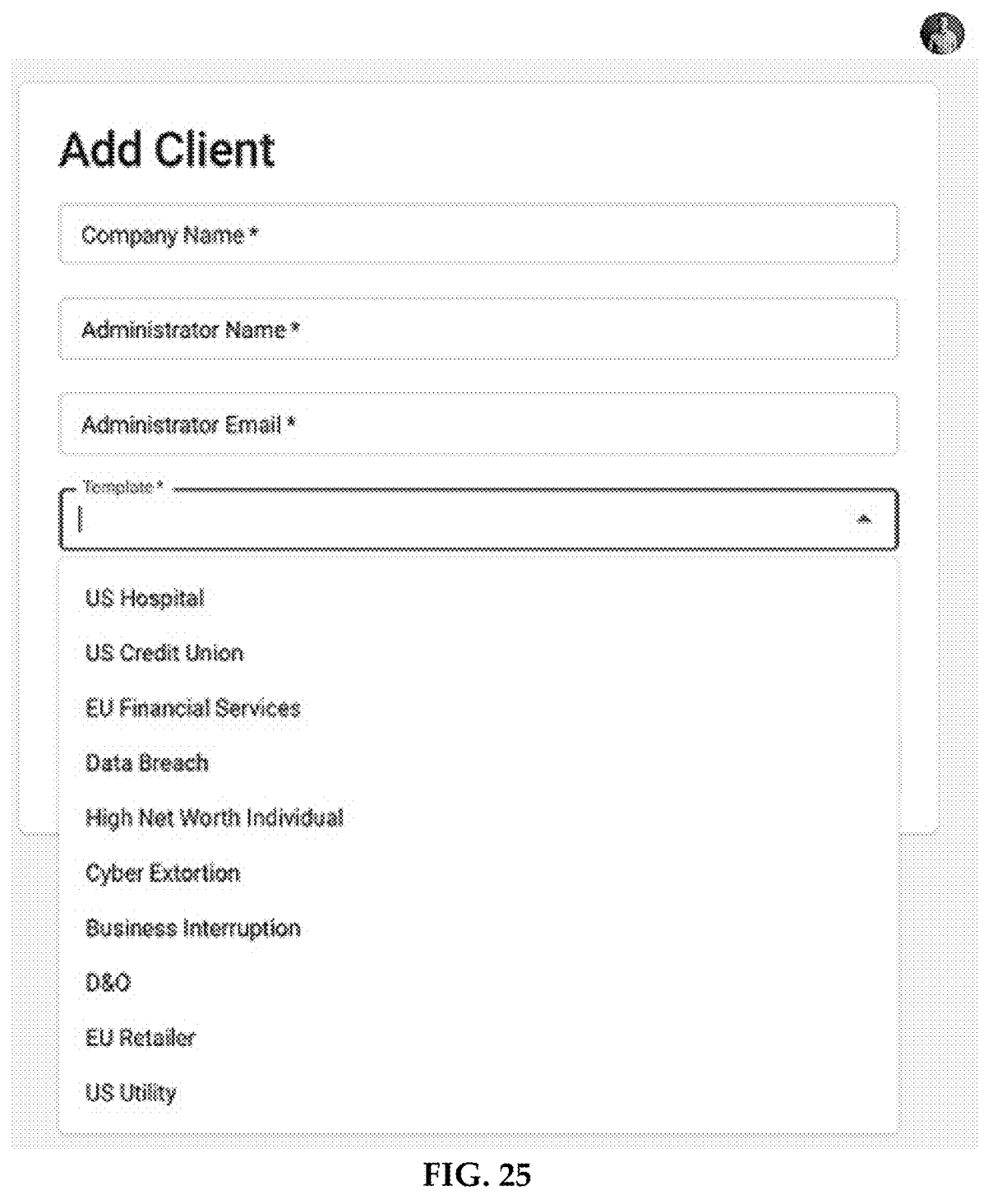

FIG. 25 illustrates an exemplary graphical user interface that is displayed on a stakeholder's device when the stakeholder selects the ADD CLIENT button on the dashboard depicted in FIG. 7. The stakeholder can enter the company name, the administrator name, and the administrator's email address in the appropriate fields of the graphical user interface. Also, the stakeholder can select which of its best practices templates should be utilized by the response system in generating the client's response center. For instance, the stakeholder may select that its Data Breach best practices template should be utilized by the response system in generating the client's response center. By doing so, the stakeholder's Data Breach best practices template is transmitted and utilized by the response system generator of the response system to generate the client's response center, in accordance with the parameters provided in the stakeholder's Data Breach best practices template. Also, in some further embodiments, clients may also be created via a system integration. The response system may receive new clients via a file or an API call and then clients are created based on the data within the call, which can be the same data that is provided in the form.

FIGS. 26A, 26B and 26C depict different types of information that may be furnished by a stakeholder as part of their best practices template, which can be used by the system as disclosed earlier herein. Specifically, FIG. 26A provides a list of exemplary groups, the location of those groups, and their designated responsibilities. Such groups may be included in the list of groups depicted in exemplary FIG. 18. FIG. 26B provides a list of facts and details that may be included as part of the stakeholder's best practices template. Such facts and details may be provided as part of the list on a graphical user interface provided to a stakeholder's client, such as the list as shown in exemplary FIG. 20.

FIG. 26C provides a list of actions as part of the stakeholder's best practice template. Those actions may be identified by the stakeholders as the types of actions that typically happen when a given event or threat occurs. These actions may be suggested by the system and provided in the list of actions on a graphical user interface provided to a stakeholder's client, such as the list of actions shown on exemplary FIG. 24. Such information of the stakeholder's best practices template can be utilized by the response system in generating a client's response center.

Figure 27:
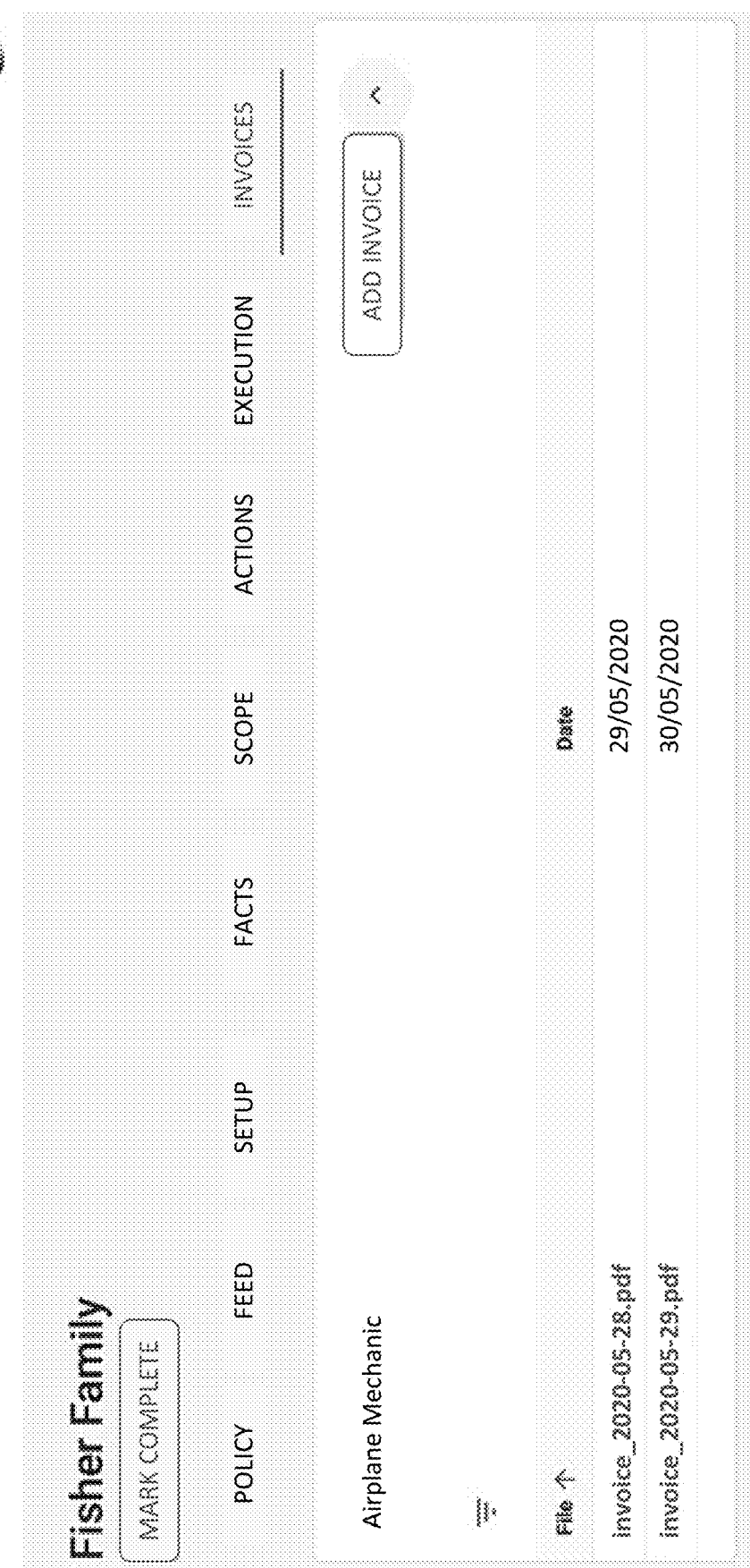
FIG. 27 illustrates an exemplary graphical user interface for an invoices tab, in accordance with certain embodiments of the present disclosure.

FIG. 27 illustrates an exemplary graphical user interface that is displayed when an INVOICES tab is selected in the response center, in accordance with some embodiments of the present disclosure. Specifically, when a client is responding to an event, the client may incur expenses and wish to track the invoices that it receives while responding to the event. As depicted in FIG. 27, several invoices from an airplane mechanic are stored in the response center under the INVOICES tab. Tracking and storing such invoices means that the client and the stakeholder can easily access this information and determine certain costs that were incurred while the client responded to an event.

FIGS. 28A, 28B, and 28C depict exemplary lists of the different types of information that may be furnished by a stakeholder as part of their best practices template for a high net worth individual or family, which can be used by the system as disclosed earlier herein. Such information of the stakeholder's best practices template can be utilized by the response system in generating a client's response center.

FIG. 29 illustrates an exemplary graphical user interface for a policy tab in a response center, in accordance with certain embodiments of the present disclosure. If a client selects the policy tab, then the various documents that make up the client's policy may be listed and provided upon selection. In a non-limiting example, FIG. 29 depicts information regarding an insurance policy that the client has with the stakeholder insurer, including but not limited to copies of the client's insurance policy documents.

FIGS. 30A-30L depict exemplary lists of the different types of information that may be furnished by a stakeholder as part of their best practices template for directors and officers, which can be used by the system as disclosed earlier herein. Such information of the stakeholder's best practices template can be utilized by the response system in generating a client's response center. In accordance with certain embodiments of the present disclosure, the best practices template guides the actual workflow in the response center. The five exemplary stages of the workflow are depicted in FIG. 4 and described earlier throughout the present disclosure. The template allows one to edit both the stages of the workflow by editing the tabs of the spreadsheet that comprise the template, as well as the details within a given stage (specific to one type of event or the other). Furthermore, the response system includes a processor to execute instructions stored in the memory for reading the spreadsheet template in order to generate the response center accordingly. In other words, the response system can automatically generate or customize the response center based on the parameters set forth in the best practices template. So, for instance, the Actions provided on exemplary FIG. 30D can be automatically populated as actions that can be presented to a client by way of a graphical user interface of an actions tab of a response center, like the one provided in FIG. 22. Similarly, the information provided in exemplary FIG. 30A regarding groups can be automatically populated as groups that can be presented to a client by way of a graphical user interface of a groups tab of a response center, like the one provided in FIG. 18.

Figure 31:
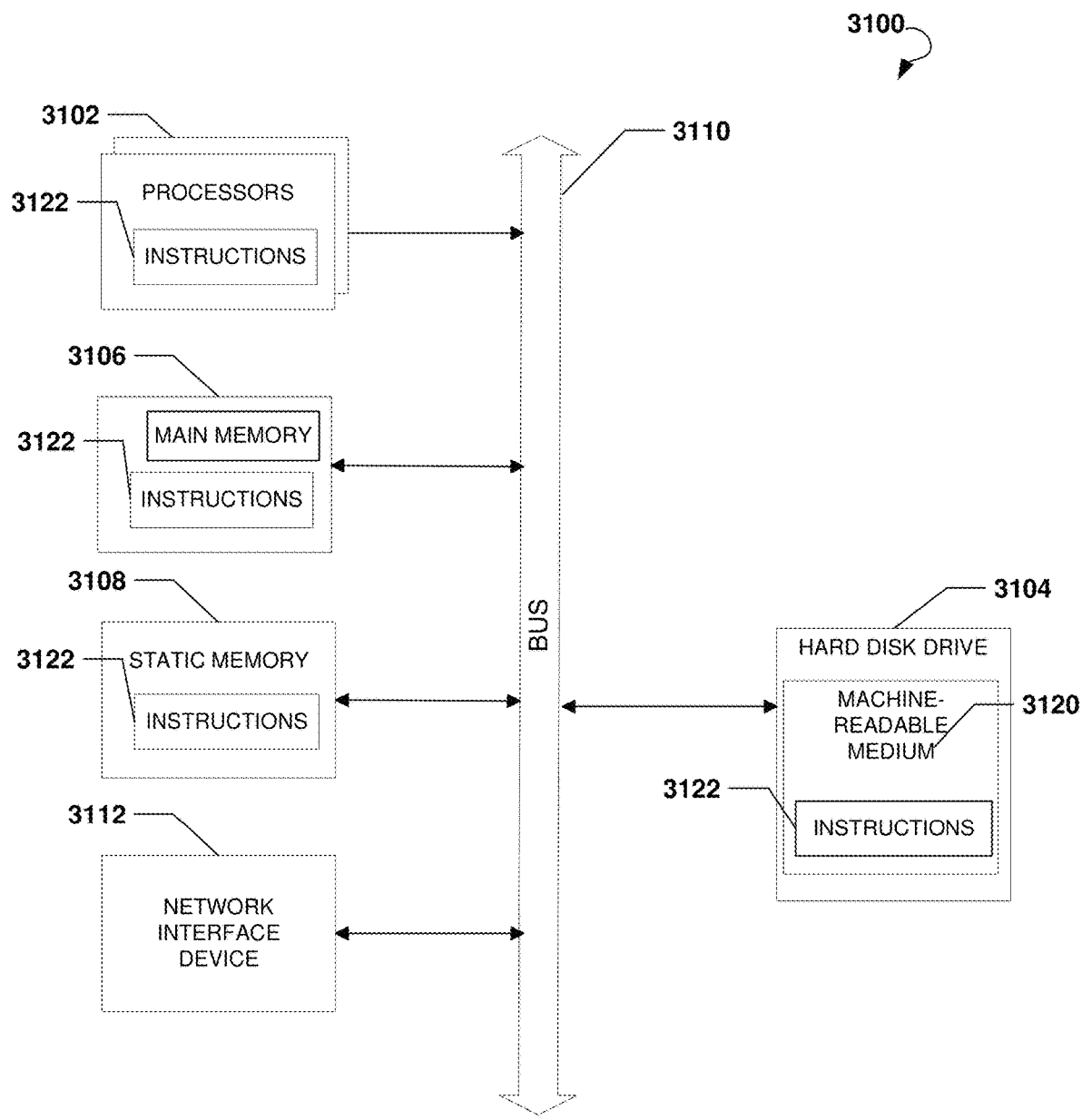
FIG. 31 illustrates a diagrammatic representation of a computing device for a machine in the exemplary electronic form of a computer system, within which a set of instructions for causing the machine to perform any one or more of the methodologies discussed herein can be executed.

FIG. 31 shows a diagrammatic representation of a computing device for a machine in the exemplary electronic form of a computer system 3100, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3100 includes a processor or multiple processors 3102, a hard disk drive 3104, a main memory 3106, and a static memory 3108, which communicate with each other via a bus 3110. The computer system 3100 may also include a network interface device 3112. The hard disk drive 3104 may include a computer-readable medium 3120, which stores one or more sets of instructions 3122 embodying or utilized by any one or more of the methodologies or functions described herein. The instructions 3122 can also reside, completely or at least partially, within the main memory 3106, the static memory 3108, and/or within the processors 3102 during execution thereof by the computer system 3100. The main memory 3106 and the processors 3102 also constitute machine-readable media.

While the computer-readable medium 3120 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 3100 may be implemented as a cloud-based computing environment, such as a virtual machine operating within a computing cloud. In other embodiments, the computer system 3100 may itself include a cloud-based computing environment, where the functionalities of the computer system 3100 are executed in a distributed fashion. Thus, the computer system 3100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for response control and analytics are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for providing response control and analytics, comprising:
   receiving, via a cloud network, data from a template of a stakeholder, the stakeholder represented as a stakeholder tenant provisioned by a response system;
   receiving, by a processor of the response system, via the cloud network, the stakeholder's request for a provisioning of a client tenant for a client;
   providing a response center to the client by the response system, to be displayed on the client's computing device, the response center provided on a graphical user interface, the response center implementing the template, the graphical user interface comprising a menu of actions for the client to perform in response to an event;
   receiving a plurality of client preferences regarding the response center, the client preferences including client analytics and feedback, based on at least one of the client's responses to past events and the client's insights of what actions are needed to respond to the event;
   based on one or more of the plurality of client preferences, customizing the response center, the customized response center initially placed in a standby mode, the standby mode indicating that the client is not currently responding to the event;
   upon receiving client input through the graphical user interface, activating the customized response center when the event has occurred;
   providing a notification to the stakeholder from the client when the customized response center is activated by the client;
   automatically re-populating the menu of the graphical user interface of the activated response center with suggested actions for the client to perform in response to the event, the suggested actions selected from least one of the template of the stakeholder and the client's preferences;
   capturing a first set of data based on activities that occur in the activated response center related to the client's actions taken in response to the event;
   generating a first set of analytics based on the captured first set of data, the analytics based on one or more of dates, time stamps and metadata of the captured data of a single client tenant;
   capturing a second set of data based on activities that occur in a plurality of response centers of client tenants related to clients' actions taken in response to the events that occurred to them;
   generating a second set of analytics based on the captured second set of data, the analytics based on one or more of dates, time stamps and metadata of the captured data of the plurality of client tenants; and
   based on the first and the second set of analytics produced by the response system, generating and transmitting an updated menu of suggested actions for responding to a future event, to one or more of the clients.

2. The method of claim 1, further comprising:
   capturing a third set of data based on global activities that are determined and derived from external sources of information, regarding external businesses or organizations and their responses to events that occurred to them;
   storing the third set of data in a global database of the response system; and
   based on the first set, the second set and a third set of analytics produced by the response system, generating and transmitting an updated menu of suggested actions for responding to a future event to the one or more of the clients.

3. The method of claim 1, further comprising receiving a user verification of the client from a service provider via the cloud network, the user verification including a security token that is received by a processor of the response system.

4. The method of claim 1, wherein the event comprises a cyber event, cyber threat, a data breach, a catastrophic disaster, ransomware, a security breach, loss of data, a catastrophic event, a plane crash, a fire, a shipwreck, an earthquake, a tornado, a flooding, and any other type of damage, destruction or disruption to a business or organization.

5. The method of claim 1, further comprising receiving the client's selection of its response team, including both internal and external team members, which will perform or otherwise contribute to the actions provided in the graphical user interface.

6. The method of claim 1, further comprising providing a menu of suggested facts to investigate as part of the client's actions taken in response to the event.

7. The method of claim 5, further comprising upon designating the response team, determining a legal regime associated with the event.

8. The method of claim 1, further comprising managing execution of one of more actions undertaken by the client in response to the event.

9. The method of claim 1, further comprising establishing roles and access controls by the response system based on an identity of an entity or a party associated with the response center.

10. A computer-implemented system for providing response control and analytics, comprising:
    a cloud network;
    a service provider for providing services via the cloud network to a response system; and
    the response system configured to:
      receive, via the cloud network, data from a template of a stakeholder, the stakeholder represented as a stakeholder tenant provisioned by the response system;
      receive, by a processor of the response system, via the cloud network, the stakeholder's request for a provisioning of a client tenant for a client;

provide a response center to the client, to be displayed on the client's computing device, the response center provided on a graphical user interface, the response center implementing the template, the graphical user interface comprising a menu of actions for the client to perform in response to an event;

receive a plurality of client preferences regarding the response center, the client preferences including client analytics and feedback, based on at least one of the client's responses to past events and the client's insights of what actions are needed to respond to the event;

based on one or more of the plurality of client preferences, customize the response center, the customized response center initially placed in a standby mode, the standby mode indicating that the client is not currently responding to the event;

upon receiving client input through the graphical user interface, activate the customized response center when the event has occurred;

provide a notification from the client to the stakeholder when the customized response center is activated by the client;

automatically re-populate the menu of the graphical user interface of the activated response center with suggested actions for the client to perform in response to the event, the suggested actions selected from least one of the template of the stakeholder and the client's preferences;

capture a first set of data based on activities that occur in the activated response center related to the client's actions taken in response to the event;

generate a first set of analytics based on the captured first set of data, the analytics based on one or more of dates, time stamps and metadata of the captured data of a single client tenant;

capture a second set of data based on activities that occur in a plurality of response centers of client tenants related to clients' actions taken in response to the events that occurred to them;

generate a second set of analytics based on the captured second set of data, the analytics based on one or more of dates, time stamps and metadata of the captured data of the plurality of client tenants; and based on the first and the second set of analytics produced by the response system, generate and transmit an updated menu of suggested actions for responding to a future event, to one or more of the clients.

11. The system of claim 10, wherein the response system is further configured to:

capture a third set of data based on global activities that are determined and derived from external sources of information, regarding external businesses or organizations and their responses to events that occurred to them;

store the third set of data in a global database of the response system; and based on the first set, the second set and a third set of analytics produced by the response system, generate and transmit an updated menu of suggested actions for responding to a future event to the one or more of the clients.

12. The system of claim 10, the response system further configured to receive a user verification of the client from the service provider via the cloud network, the user verification including a security token that is received by the processor of the response system.

13. The system of claim 10, wherein the event comprises a cyber event, cyber threat, a data breach, a catastrophic disaster, ransomware, a security breach, loss of data, a catastrophic event, a plane crash, a fire, a shipwreck, an earthquake, a tornado, a flooding, and any other type of damage, destruction or disruption to a business or organization.

14. The system of claim 10, the response system further configured to receive the client's selection of its response team, including both internal and external team members, which will perform or otherwise contribute to the actions provided in the graphical user interface.

15. The system of claim 10, the response system further configured to provide a menu of suggested facts to investigate as part of the client's actions taken in response to the event.

16. The system of claim 14, wherein upon receiving the client's selection of its response team, the response system is further configured to receive a determination of a legal regime associated with the event.

17. The system of claim 10, the response system further configured to manage execution of one of more actions undertaken by the client in response to the event.

18. The system of claim 10, the response system further configured to establish roles and access controls based on an identity of an entity or a party associated with the response center.

19. A computer-implemented system for providing response control and analytics, comprising:

means for receiving, via a cloud network, data from a template of a stakeholder, the stakeholder represented as a stakeholder tenant provisioned by a response system;

means for receiving, by a processor of the response system, via the cloud network, a stakeholder's request for a provisioning of a client tenant for a client;

means for providing a response center to the client by the response system, to be displayed on a client's computing device, the response center provided on a graphical user interface, the response center implementing the template, the graphical user interface comprising a menu of actions for the client to perform in response to an event;

means for receiving a plurality of client preferences regarding the response center, the client preferences including client analytics and feedback, based on at least one of the client's responses to past events and the client's insights of what actions are needed to respond to the event;

based on one or more of the plurality of client preferences, means for customizing the response center, the customized response center initially placed in a standby mode, the standby mode indicating that the client is not currently responding to the event;

upon receiving client input through the graphical user interface, means for activating the customized response center when the event has occurred;

means for providing a notification from the client to the stakeholder when the customized response center is activated by the client;

means for automatically re-populating the menu of the graphical user interface of the activated response center with suggested actions for the client to perform in response to the event, the suggested actions selected from least one of the template of the stakeholder and the client's preferences;

means for capturing a first set of data based on activities that occur in the activated response center related to the client's actions taken in response to the event;

means for generating a first set of analytics based on the captured first set of data, the analytics based on one or more of dates, time stamps and metadata of the captured data of a single client tenant;

means for capturing a second set of data based on activities that occur in a plurality of response centers of client tenants related to clients' actions taken in response to the events that occurred to them;

means for generating a second set of analytics based on the captured second set of data, the analytics based on one or more of dates, time stamps and metadata of the captured data of the plurality of client tenants; and based on the first and the second set of analytics produced by the response system, means for generating and transmitting an updated menu of suggested actions for responding to a future event, to one or more of the clients.

20. The system of claim 19, further comprising:

means for capturing a third set of data based on global activities that are determined and derived from external sources of information, regarding external businesses or organizations and their responses to events that occurred to them;

means for storing the third set of data in a global database of the response system; and based on the first set, the second set and a third set of analytics produced by the response system, means for generating and transmitting an updated menu of suggested actions for responding to a future event to the one or more of the clients.

* * * * *